United States Patent
Rom et al.

(10) Patent No.: US 12,542,631 B2
(45) Date of Patent: Feb. 3, 2026

(54) APPARATUS, METHOD, PROGRAM PRODUCTS FOR MAXIMIZING DESIRED MULTI-TRANSMISSION POINT SIGNAL TO INTER-LAYER-GROUP-INTERFERENCE VIA UE BEAM CONTROL

(71) Applicant: Nokia Technologies Oy, Espoo (FI)

(72) Inventors: Christian Rom, Aalborg (DK); Kim Nielsen, Aalborg (DK); Samantha Caporal Del Barrio, Aalborg (DK); Simon Svendsen, Aalborg (DK); Amol Dhere, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 369 days.

(21) Appl. No.: 18/448,513

(22) Filed: Aug. 11, 2023

(65) Prior Publication Data

US 2024/0072952 A1    Feb. 29, 2024

Related U.S. Application Data

(60) Provisional application No. 63/400,611, filed on Aug. 24, 2022.

(51) Int. Cl.
*H04L 5/00* (2006.01)
*H04B 7/06* (2006.01)
*H04B 17/345* (2015.01)

(52) U.S. Cl.
CPC ....... *H04L 5/0035* (2013.01); *H04B 7/06952* (2023.05); *H04B 17/345* (2015.01); *H04L 5/0091* (2013.01)

(58) Field of Classification Search
CPC . H04L 5/0035; H04L 5/0091; H04B 7/06952; H04B 17/345; H04B 7/0695
See application file for complete search history.

(56) References Cited

U.S. PATENT DOCUMENTS 9,565,666 B2 * 2/2017 Aiba ................... H04L 1/0067
10,149,220 B2 * 12/2018 Liang .................. H04W 24/10
(Continued)

FOREIGN PATENT DOCUMENTS

| EP | 4312386 A1 | 1/2024 |
| WO | 2021/213656 A1 | 10/2021 |

(Continued)

OTHER PUBLICATIONS

"3rd Generation Partnership Project; Technical Specification Group Radio Access Network; NR; Physical layer procedures for data (Release 17)", 3GPP TS 38.214, V17.2.0, Jun. 2022, pp. 1-228.
(Continued)

*Primary Examiner* — Fahmida S Chowdhury
(74) *Attorney, Agent, or Firm* — Nokia Technologies Oy

(57) ABSTRACT

An apparatus is provided that includes at least receiver circuitry, a processor, and memory. The apparatus also includes a plurality of directional antennas configured to simultaneously receive different downlink signals for each polarization. The apparatus further includes control circuitry for controlling processes for beam sweeping, beam refinement, and selecting a beam pair that maximizes signal strength while minimizing inter-layer-group interference. A portable electronic device and a stationary electronic device that include the apparatus are also provided. A method carried out by means, such as the apparatus, is also provided. A computer program product, such as a non-transitory computer readable medium, for causing an apparatus to carry out such a method is also provided.

21 Claims, 28 Drawing Sheets

(56) References Cited

U.S. PATENT DOCUMENTS

| | | | | |
|---|---|---|---|---|
| 10,536,253 | B2* | 1/2020 | Damnjanovic | H04L 5/0005 |
| 11,102,818 | B2* | 8/2021 | Chen | H04L 5/0044 |
| 12,261,664 | B2* | 3/2025 | Kim | H04L 27/261 |
| 2019/0014568 | A1* | 1/2019 | Nilsson | H04B 7/088 |
| 2021/0143889 | A1* | 5/2021 | Akoum | H04B 7/0417 |
| 2021/0297135 | A1* | 9/2021 | Kim | H04B 7/0626 |
| 2021/0360672 | A1* | 11/2021 | Kim | H04L 5/0035 |
| 2022/0104182 | A1* | 3/2022 | Kim | H04L 5/0051 |
| 2022/0116183 | A1* | 4/2022 | Gao | H04L 1/1896 |
| 2022/0124761 | A1* | 4/2022 | Muruganathan | H04W 72/1273 |
| 2022/0131580 | A1* | 4/2022 | Kuchi | H04B 7/0452 |
| 2022/0239358 | A1* | 7/2022 | Kim | H04B 7/063 |
| 2022/0393817 | A1* | 12/2022 | Kuchi | H04L 5/0023 |
| 2023/0056263 | A1* | 2/2023 | Kim | H04B 7/0456 |
| 2023/0088818 | A1* | 3/2023 | Chou | H04B 7/0469 |
| | | | | 370/329 |
| 2023/0171623 | A1* | 6/2023 | Zeineddine | H04L 5/0035 |
| | | | | 370/252 |
| 2024/0072952 | A1* | 2/2024 | Rom | H04L 5/0091 |
| 2024/0107612 | A1* | 3/2024 | Nilsson | H04W 16/28 |
| 2024/0372589 | A1* | 11/2024 | Nilsson | H04B 7/0626 |

FOREIGN PATENT DOCUMENTS

| | | |
|---|---|---|
| WO | 2021/214710 A1 | 10/2021 |
| WO | 2022/155250 A1 | 7/2022 |

OTHER PUBLICATIONS

"New WID: Requirement for NR frequency range 2 (FR2) multi-Rx chain DL reception", 3GPP TSG RAN Meeting #95e, RP-220974, Agenda: 9.1.4, Qualcomm Incorporated, Mar. 17-23, 2022, 5 pages.

"3rd Generation Partnership Project; Technical Specification Group Radio Access Network; NR; Physical layer procedures for control (Release 17)", 3GPP TS 38.213, V17.2.0, Jun. 2022, pp. 1-256.

"Rel. 18 RAN4 Package Approval", 3GPP TSG RAN Meeting #93-e, RP-212139, Agenda: 9.0.5, Qualcomm Incorporated, Sep. 13-17, 2021, 6 pages.

"Revised WID: Requirement for NR frequency range 2 (FR2) multi-Rx chain DL reception", 3GPP TSG RAN Meeting #96, RP-221753, Agenda: 9.3.4.4, Qualcomm Incorporated, Jun. 6-9, 2022, 5 pages.

"(Moderator) Summary of CSI enhancements for MTRP and FDD (Round 0)", 3GPP TSG RAN WG1 Meeting #105-e, R1-210xxxx, Agenda: 8.1.4, Huawei, May 10-27, 2021, 63 pages.

"IEEE 802.11", Wikipedia, Retrieved on Aug. 1, 2023, Webpage available at : https://en.wikipedia.org/wiki/IEEE_802.11.

"IEEE 802.16", Wikipedia, Retrieved on Aug. 1, 2023, Webpage available at : https://en.wikipedia.org/wiki/IEEE_802.16.

"IEEE 802.3", Wikipedia, Retrieved on Aug. 1, 2023, Webpage available at : https://en.wikipedia.org/wiki/IEEE_802.3.

"3rd Generation Partnership Project; Technical Specification Group Radio Access Network;radio transmission and reception; Part 2: Range 2 Standalone (Release 18)", 3GPP TS 38.101-2,2023, pp. 1-230.

Extended European Search Report received for corresponding European Patent Application No. 23191269.2, dated Jan. 24, 2024, 4 pages.

"Enhancements on multi-TRP/panel transmission", 3GPP TSG RAN WG1 #99, R1-1912893, Agenda: 7.2.8.2, NTT Docomo Inc, Nov. 18-22, 2019, 21 pages.

"Enhancements on beam management for multi-TRP", 3GPP TSG RAN WG1 Meeting #103-e, R1-2007766, Agenda: 8.1.2.3, ZTE, Oct. 26-Nov. 13, 2020, 13 pages.

\* cited by examiner

CASE2: "narrow"

CASE1: "wide"

APPARATUS, METHOD, PROGRAM PRODUCTS FOR MAXIMIZING DESIRED MULTI-TRANSMISSION POINT SIGNAL TO INTER-LAYER-GROUP-INTERFERENCE VIA UE BEAM CONTROL

RELATED APPLICATION

This application claims priority to the U.S. Provisional Application No. 63/400,611, filed on Aug. 24, 2022, the content of which is incorporated herein by reference in its entirety.

TECHNOLOGICAL FIELD

Embodiments of the present disclosure relate to apparatuses, methods, and computer program products that support multiple input multiple output (MIMO) downlink reception by user equipment (UE).

BACKGROUND

Beam-formed communication describes radio communication using a beam. A beam is a spatially constrained channel. The beam has directivity which is the direction of maximum gain for the spatially constrained channel.

A beam can be formed, in transmission, by weighting a signal applied to each antenna element used for transmission with a phasor represented by an amplitude and phase. The amplitude and phases are chosen for each antenna element to obtain constructive interference along the directivity. The antenna elements are often arranged in a regular array. An equivalent approach can be used in reception, according to the theorem of reciprocity.

In radio communications, especially spatially controlled communications such as cellular communication and/or beam-formed communication, it is desirable to prevent transmitters from 'shouting' outside their space and prevent receivers from being too sensitive and listening outside their space. It is therefore desirable to control the gain of transmitters and receivers. In beam-formed communication this is performed by adapting the amplitude of the phasors used for weighting.

Modern telecommunication systems use spatial diversity for transmission and/or reception. This can be used at transmission to transfer the same information down different spatial channels or to spread information over different channels to increase information transfer rates. It can be used at reception to receive multipath signals comprising the same information or to receive the same or different information transmitted in diverse spatial channels.

Modern telecommunication systems can use phased delay antennas to control a shape of a radiation pattern associated with the antenna to form a beam that can be directed. The beam has a narrow spread and a very high gain. A phased delay antenna typically comprises a one- or two-dimensional array of antenna elements each of which is associated with an individually controllable gain and an individually controllable phase delay. The phased delay antenna uses variable constructive interference of wavefronts to move the beam.

Modern telecommunication standards can require that spatial diversity of transmission and reception is used to support multiple input multiple output (MIMO).

Modern telecommunication standards can require that beam forming at transmission and reception is used, at least at base stations, to support massive multiple input multiple output (mMIMO).

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, examples there is provided an apparatus comprising: at least one processor; and at least one memory storing instructions that, when executed by the at least one processor, cause the apparatus at least to: determine that two or more different downlink signals received simultaneously from two or more different transmission points should be received on a single mmWave antenna array module of the apparatus, wherein respective downlink signals of the two or more different downlink signals comprise one or two layers per signal carrying the transmission configuration indicator, TCI, at least one downlink control information, and one or more channel state information per transmission point, and wherein respective downlink signals of the two or more different downlink signals further comprise one or more TCIs, respective TCIs having a respective TCI state; receive, simultaneously, on the single mmWave antenna array module of the apparatus, the two or more different downlink signals from the two or more different transmission points; and steer one or more receiver spatial filters in order to maximize a signal to inter-layer-group-interference, SILGI, ratio, the SILGI ratio being a ratio of a unique beamforming array, UBA, desired signal to inter-layer-group-interference.

In some embodiments, the apparatus is further configured to steer the receiver spatial filters by: for respective TCI states, performing coarse narrow beam refinement to find angles of arrival, AoAs, that maximize a received signal power, a reference signal received power, RSRP, or a reference signal strength indicator, RSSI, on a respective UBA.

In some embodiments, the apparatus is further configured to steer the receiver spatial filter by: for respective TCI states, performing refined narrow beam refinement to find AoAs that maximize the SILGI ratio while the received signal power, the RSRP, or the RSSI of the downlink signal is maintained above a signal threshold.

In some embodiments, the apparatus is further configured to: determine that the apparatus is configured for reception of simultaneous transmission from multiple transmission points with multiple active TCI states that are not sharing spatial receiver filters at the apparatus.

In some embodiments, the apparatus is further configured to: determine, based on the determination that the apparatus is configured for reception of simultaneous transmission from multiple transmission points with multiple active TCI states that are not configured for sharing spatial receiver filters at the apparatus, multiple downlink control information, DCIs, with full overlapping time and frequency resource elements of a physical downlink shared channel, PDSCH.

In some embodiments, the received signal power is equal to or greater than an RSRP threshold.

In some embodiments, the apparatus is further configured to perform the coarse narrow beam refinement for each TCI state to find AoAs that maximize at least one of the received signal power, the RSRP, or the RSSI on each UBA, to find the two dual polarized beams with the strongest received signal power, RSRP, or RSSI, via a narrow beam sweep, during one or more of: aperiodic transmission of non-zero power channel state information reference symbols, NZP-CSI-RS, with repetition being implemented for respective active TCI states, synchronization symbol, SS, bursts, or cyclic prefix based on beam sweeping during/via a physical downlink shared channel, PDSCH.

In some embodiments, the apparatus is further configured to perform the refined narrow beam refinement by: measuring a desired signal for a first UBA and a second UBA of a same mmWave antenna array module; measuring inter-layer-group interference, ILGI, for the first UBA and the second UBA of the same mmWave antenna array module; and calculating the SILGI ratio for the first UBA and the second UBA of the same mmWave antenna array module.

In some embodiments, the apparatus is further configured to: after completing a measurement sequence of a full orthogonal frequency-division multiplexing, OFDM, symbol burst, discard the measurements from the beams that lead to a desired signal level below the signal threshold.

In some embodiments, the apparatus is further configured to steer the receiver spatial filter in order to increase the SILGI ratio by: steering UBA beam 1 away from AoA2 from TCI2; and steering UBA beam 2 away from AoA1 from TCI1.

In some embodiments, the apparatus is configured to: send, to the network node, an indication for at least each TCI of at least one or more of: a signal strength of the desired signal, the IGLI, or the SILGI.

In some embodiments, the indication of one of more of: the strength of the desired signal, the ILGI, or the SILGI for each TCI is included in at least one of: uplink control information, an L1 reporting message, or a medium access control, MAC, message.

According to other embodiments, a method can be carried out by means, such as an apparatus described herein, e.g., comprising a processor and a memory storing computer program codes or instructions for causing the apparatus to carry out the method. In some embodiments, the method can comprise determining, at a user equipment, that two or more different downlink signals received simultaneously from two or more different transmission points should be received on a single mmWave antenna array module of the user equipment, wherein respective downlink signals of the two or more different downlink signals comprise one or two layers per signal carrying the transmission configuration indicator, TCI, at least one downlink control information, and one or more channel state information per transmission point, and wherein respective downlink signals of the two or more different downlink signals further comprise one or more TCIs, respective TCIs having a respective TCI state; receiving, simultaneously, on the single mmWave antenna array module of the user equipment, the two or more different downlink signals from the two or more different transmission points; and steering one or more receiver spatial filters in order to maximize a signal to inter-layer-group-interference, SILGI, ratio, the SILGI ratio being a ratio of a unique beamforming array, UBA, desired signal to inter-layer-group-interference.

In some embodiments, the steering the receiver spatial filter comprises: for respective TCI states, performing coarse narrow beam refinement to find angles of arrival, AoAs, that maximize a received signal power, a reference signal received power, RSRP, or a reference signal strength indicator, RSSI, on a respective UBA.

In some embodiments, the steering the receiver spatial filter comprises: for respective TCI states, performing refined narrow beam refinement to find AoAs that maximize the SILGI ratio while the received signal power, the RSRP, or the RSSI of the downlink signal is maintained above a signal threshold.

In some embodiments, the method can further comprise: determining that the user equipment is configured for reception of simultaneous transmission from multiple transmission points with multiple active TCI states that are not sharing spatial receiver filters at the user equipment.

In some embodiments, the method can further comprise: determining, based on the determination that the user equipment is configured for reception of simultaneous transmission from multiple transmission points with multiple active TCI states that are not configured for sharing spatial receiver filters at the user equipment, multiple downlink control information, DCIs, with full overlapping time and frequency resource elements of a physical downlink shared channel, PDSCH.

In some embodiments, the signal received power is equal to or greater than an RSRP threshold.

In some embodiments, the performing coarse narrow beam refinement for each TCI state to find AoAs that maximize at least one of the received signal power, the RSRP, or the RSSI on each UBA, to find the two dual polarized beams with the strongest received signal power, RSRP, or RSSI, via a narrow beam sweep, is carried out during one or more of: aperiodic transmission of non-zero power channel state information reference symbols, NZP-CSI-RS, with repetition being implemented for respective active TCI states, synchronization symbol, SS, bursts, or cyclic prefix based on beam sweeping during/via a physical downlink shared channel, PDSCH.

In some embodiments, the performing refined narrow beam refinement comprises: measuring a desired signal for a first UBA and a second UBA of a same mmWave antenna array module; measuring inter-layer-group interference, ILGI, for the first UBA and the second UBA of the same mmWave antenna array module; and calculating the SILGI ratio for the first UBA and the second UBA of the same mmWave antenna array module.

In some embodiments, the method can further comprise: after completing a measurement sequence of a full orthogonal frequency-division multiplexing, OFDM, symbol burst, discarding the measurements from the beams that lead to a desired signal level below the signal threshold.

In some embodiments, the steering the receiver spatial filter in order to increase the SILGI ratio comprises: steering UBA beam 1 away from AoA2 from TCI2; and steering UBA beam 2 away from AoA1 from TCI1.

In some embodiments, the method can further comprise: sending, to the network node, an indication for at least each TCI of at least one or more of: a signal strength of the desired signal, the IGLI, or the SILGI.

In some embodiments, the indication of one of more of: the strength of the desired signal, the ILGI, or the SILGI for each TCI is included in at least one of: uplink control information, an L1 reporting message, or a medium access control, MAC, message.

According to other embodiments, a non-transitory storage medium can be provided that stores program instructions that, when executed by a processor, cause a user equipment to perform at least the following: determining, at a user equipment, that two or more different downlink signals received simultaneously from two or more different transmission points should be received on a single mmWave antenna array module of the user equipment, wherein respective downlink signals of the two or more different downlink signals comprise one or two layers per signal carrying the transmission configuration indicator, TCI, at least one downlink control information, and one or more channel state information per transmission point, and wherein respective downlink signals of the two or more different downlink signals further comprise one or more TCIs, respective TCIs having a respective TCI state; receiving, simultaneously, on the single mmWave antenna array module of the user equipment, the two or more different downlink signals from the two or more different transmission points; and steering one or more receiver spatial filters in order to maximize a signal to inter-layer-group-interference, SILGI, ratio, the SILGI ratio being a ratio of a unique beamforming array, UBA, desired signal to inter-layer-group-interference.

In some embodiments, the program instructions, when executed by the processor, cause the user equipment to perform the steering of the receiver spatial filter by: for respective TCI states, performing coarse narrow beam refinement to find angles of arrival, AoAs, that maximize a received signal power, a reference signal received power, RSRP, or a reference signal strength indicator, RSSI, on a respective UBA.

In some embodiments, the program instructions, when executed by the processor, cause the user equipment to perform the steering of the receiver spatial filter by: for respective TCI states, performing refined narrow beam refinement to find AoAs that maximize the SILGI ratio while the received signal power, the RSRP, or the RSSI of the downlink signal is maintained above a signal threshold.

In some embodiments, the program instructions, when executed by the processor, cause the user equipment to perform: determining that the user equipment is configured for reception of simultaneous transmission from multiple transmission points with multiple active transmission configuration indicator (TCI) states that are not sharing spatial receiver filters at the user equipment.

In some embodiments, the program instructions, when executed by the processor, cause the user equipment to perform: determining, based on the determination that the user equipment is configured for reception of simultaneous transmission from multiple transmission points with multiple active TCI states that are not configured for sharing spatial receiver filters at the user equipment, multiple downlink control information, DCIs, with full overlapping time and frequency resource elements of a physical downlink shared channel, PDSCH.

In some embodiments, the signal received power is equal to or greater than an RSRP threshold.

In some embodiments, the program instructions, when executed by the processor, cause the user equipment to perform the coarse narrow beam refinement for each TCI state to find AoAs that maximize one or more of the received signal power, the RSRP, or the RSSI on each UBA, to find the two dual polarized beams with the strongest received signal power, RSRP, or RSSI, via a narrow beam sweep, is carried out during one or more of: aperiodic transmission of non-zero power channel state information reference symbols, NZP-CSI-RS, with repetition being implemented for respective active TCI states, synchronization symbol, SS, bursts, or cyclic prefix based on beam sweeping during/via a physical downlink shared channel, PDSCH.

In some embodiments, the program instructions, when executed by the processor, cause the user equipment to perform the refined narrow beam refinement by: measuring a desired signal for a first UBA and a second UBA of a same mmWave antenna array module; measuring inter-layer-group interference, ILGI, for the first UBA and the second UBA of the same mmWave antenna array module; and calculating the SILGI ratio for the first UBA and the second UBA of the same mmWave antenna array module.

In some embodiments, the program instructions, when executed by the processor, cause the user equipment to perform: after completing a measurement sequence of a full orthogonal frequency-division multiplexing, OFDM, symbol burst, discarding the measurements from the beams that lead to a desired signal level below the signal threshold.

In some embodiments, the program instructions, when executed by the processor, cause the user equipment to perform the steering of the receiver spatial filter in order to increase the SILGI ratio by: steering UBA beam 1 away from AoA2 from TCI2; and steering UBA beam 2 away from AoA1 from TCI1.

In some embodiments, the program instructions, when executed by the processor, cause the user equipment to perform: sending, to the network node, an indication for at least each TCI of at least one or more of: a signal strength of the desired signal, the IGLI, or the SILGI.

In some embodiments, the indication of one of more of: the strength of the desired signal, the ILGI, or the SILGI for each TCI is included in at least one of: uplink control information, an L1 reporting message, or a medium access control, MAC, message.

According to other embodiments, an apparatus can be provided that comprises means for determining that two or more different downlink signals received simultaneously from two or more different transmission points should be received on a single mmWave antenna array module of the apparatus, wherein respective downlink signals of the two or more different downlink signals comprise one or two layers per transmission point, at least one downlink control information, and one or more channel state information per transmission point, and wherein respective downlink signals of the two or more different downlink signals further comprise one or more transmission configuration indicators, TCIs, respective TCIs having a respective TCI state; means for receiving, simultaneously, on the single mmWave antenna array module of the apparatus, the two or more different downlink signals from the two or more different transmission points; and means for steering one or more receiver spatial filters in order to maximize a signal to inter-layer-group-interference, SILGI, ratio, the SILGI ratio being a ratio of a unique beamforming array, UBA, desired signal to inter-layer-group-interference, ILGI.

In some embodiments, the means for steering the receiver spatial filter comprise: means for, for respective TCI states, performing coarse narrow beam refinement to find angles of arrival, AoAs, that maximize one or more of a received signal power, a reference signal received power, RSRP, or a reference signal strength indicator, RSSI, on a respective UBA.

In some embodiments, the means for steering the receiver spatial filter comprise: means for, for respective TCI states, performing refined narrow beam refinement to find AoAs that maximize the SILGI ratio while the received signal power, the RSRP, or the RSSI of the downlink signal is maintained above a signal threshold.

In some embodiments, the apparatus can further comprise: means for determining that the apparatus is configured for reception of simultaneous transmission from multiple transmission points with multiple active TCI states that are not sharing spatial receiver filters at the apparatus.

In some embodiments, the apparatus can further comprise: means for determining, based on the determination that the apparatus is configured for reception of simultaneous transmission from multiple transmission points with multiple active TCI states that are not configured for sharing spatial receiver filters at the apparatus, multiple DCIs with full overlapping time and frequency resource elements of a physical downlink shared channel, PDSCH.

In some embodiments, the signal received power is equal to or greater than an RSRP threshold.

In some embodiments, the means for performing the coarse narrow beam refinement comprise means for performing coarse narrow beam refinement for each TCI state to find AoAs that maximize one or more of the received signal power, the RSRP, or the RSSI on each UBA, to find the two dual polarized beams with the strongest received signal power, RSRP, or RSSI, via a narrow beam sweep, is carried out during one or more of: aperiodic transmission of non-zero power channel state information reference symbols, NZP-CSI-RS, with repetition being implemented for respective active TCI states, synchronization symbol, SS, bursts, or cyclic prefix based on beam sweeping during/via a physical downlink shared channel, PDSCH.

In some embodiments, the means for performing the refined narrow beam refinement comprise: means for measuring a desired signal for a first UBA and a second UBA of a same mmWave antenna array module; means for measuring inter-layer-group interference, ILGI, for the first UBA and the second UBA of the same mmWave antenna array module; and means for calculating the SILGI ratio for the first UBA and the second UBA of the same mmWave antenna array module.

In some embodiments, the apparatus can further comprise: means for, after completing a measurement sequence of a full orthogonal frequency-division multiplexing, OFDM, symbol burst, discarding the measurements from the beams that lead to a desired signal level below the signal threshold.

In some embodiments, the means for steering the receiver spatial filter in order to increase the SILGI ratio comprise: means for steering UBA beam 1 away from AoA2 from TCI2; and means for steering UBA beam 2 away from AoA1 from TCI1.

In some embodiments, the apparatus can further comprise: means for sending, to the network node, an indication for at least each TCI of at least one or more of: a signal strength of the desired signal, the IGLI, or the SILGI.

In some embodiments, the indication of one of more of: the strength of the desired signal, the ILGI, or the SILGI for each TCI is included in at least one of: uplink control information, an L1 reporting message, or a medium access control, MAC, message.

According to various, but not necessarily all examples, a portable electronic device or a stationary electronic device comprises the apparatus. Alternatively, the apparatus is a portable device or stationary electronic device.

According to various, but not necessarily all, embodiments there is provided examples as claimed in the appended claims.

BRIEF DESCRIPTION OF THE DRAWINGS

Some examples will now be described with reference to the accompanying drawings in which.

Figure 1:
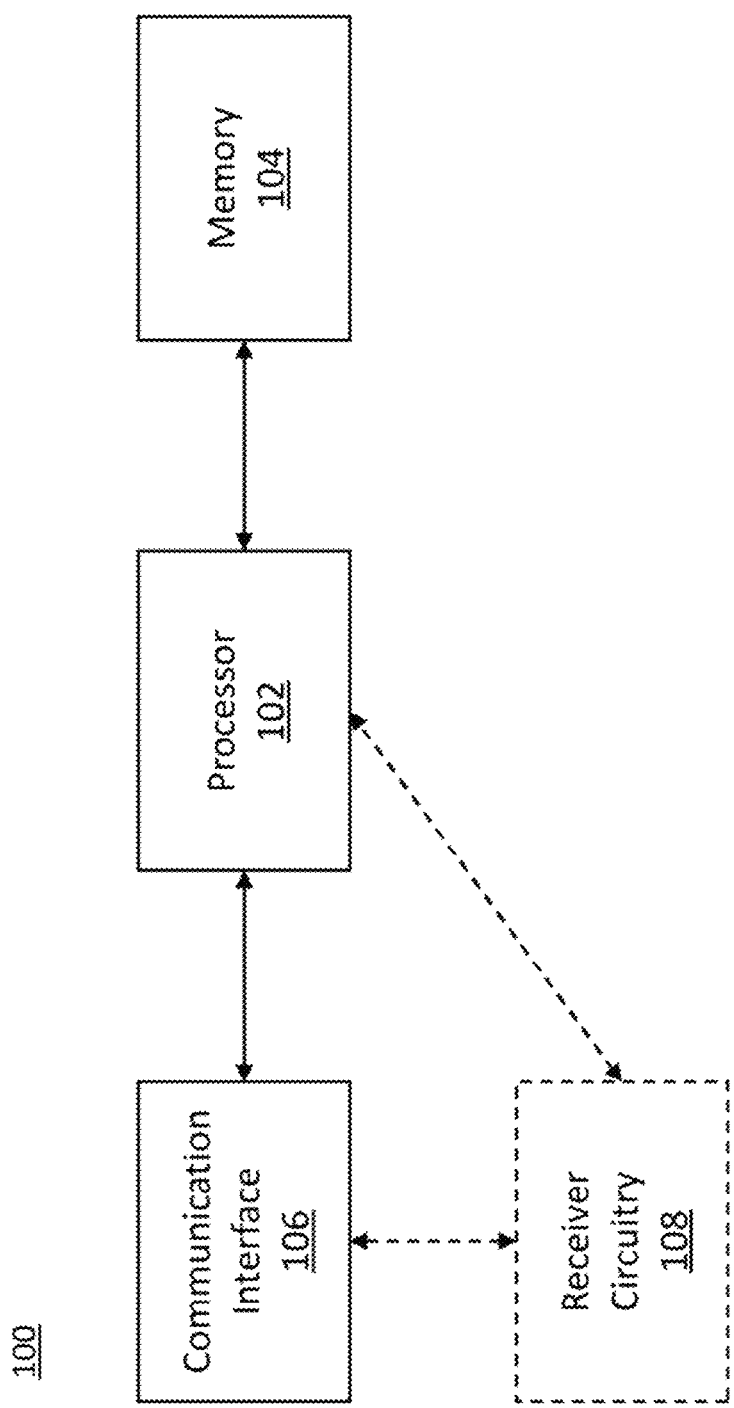
FIG. 1 illustrates an example computing device for communicating over communication networks with elements or functions of the communication networks, according to some embodiments.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DEFINITIONS & ACRONYMS

Where acronyms are used and not defined, they refer to acronyms as used in the 3GPP Specifications and equivalent terms.

Additionally, the following terms are defined:
AoA—Angle of Arrival, refers to a given steering angle of a given beam.
CSI—Channel State Information
CSI-RS—Channel State Information Reference Signal
DL—Downlink
DCI—Downlink Control Information
eMIMO—Enhanced Multiple Input Multiple Output
FR2—Frequency range 2
gNB—g-Node B (e.g., Base Station)
HPBW—Half Power Beam Width
MIMO—Multiple Input Multiple Output
MPUE—Multi Panel UE; e.g., an mmWave antenna array module
NR—New Radio (5G)
PRACH—Physical Random-Access Channel
RF—Radio Frequency
RRM—Radio Resource Management
RX—Reception/Receiver
SNR—Signal-to-Noise Ratio
SSB—Synchronization Signal Block
TX—Transmission/Transmitter
UBA—Unique Beamformed Arrays: an antenna array or sub-array and front end RF architecture comprising one or more combined elements, the one or more combined elements being configured to control one beam for at least one or more polarizations forming an RX filter.

DETAILED DESCRIPTION

In next generation/new radio (NR) telecommunication systems (e.g., LTE, 5G, 6G, etc.), multiple transmission and reception points (multi-TRPs) will be desirable in order to improve reliability, coverage, and capacity performance through flexible deployment scenarios. For example, to be able to support the significant growth in mobile data traffic in 5G and to enhance the coverage, the wireless devices are expected to access networks composed of multi-TRPs (i.e., macro-cells, small cells, pico-cells, femto-cells, remote radio heads, relay nodes, etc.

In NR, which has moved towards mmWave bands, signal loss over larger distances has spurred the development of beamforming, which uses highly-aligned direction transmitter/receiver pairs to establish spatially diverse directional links. However, beamforming requires finer alignment of transmitter and receiver beams. Such beam management is contemplated to be achieved through network-side control, by which the user equipment (UE) is directed in its fine-tuning of transmitter/receiver settings.

During beam establishment between transmission points (TPs) and the UE, according to some implementations, the UE receives a synchronization signal block (SSB) in an SS burst, the UE identifies the best beam from the SS burst, the UE transmits a preamble random access request (PRACH) to initiate a random access (RA) procedure. The TP and the UE will then exchange several messages, including a channel state information reference signals for beam management (CSI-RS-BM), which can be analyzed to determine a reference signal receiver power (RSRP) and other values. Based on this analysis and the RSRP (and/or other values), the TP/UE can fine-tune the transmitter/receiver to improve beamforming accuracy.

A beam sweeping approach can be carried out by the UE, and the TP can indicate when an initial/ideal beam pair is identified. However, in FR2 bands and the like, there is currently no established or defined minimum UE requirements for the situation in which 4-layer multiple input/multiple output (MIMO) reception is used by the UE. This is despite the fact that, in FR2, 4-layer MIMO reception requires beam reception from at least two directions. Instead, for 4-layer MIMO reception of beams from at least two directions, no performance requirements have yet been specified.

Additionally, the simultaneous reception of multiple beams from different directions by a 4-layer MIMO equipped/configured receiver may require support of simultaneous multi-panel operation with several independent receiver (RX) beams/chains at the UE side.

There is further no established or defined approach, at least to the knowledge of the inventors, for determining when the UE equipped with a plurality of panels (e.g., mmWave antenna array module) should use a single/same panel for simultaneous reception of two downlink signals.

Accordingly, the inventors have identified the need to introduce necessary requirement(s) for enhanced FR2 UEs with simultaneous DL reception with two different downlink signals (e.g., TypeD RSs), e.g., on a single component carrier with up to 4 layer DL MIMO. The inventors have further identified the need to introduce necessary requirement(s) for enhanced FR2 UEs with simultaneous DL reception from different directions with different downlink signals. The inventors have further identified the need to identify UE demodulation requirements. The inventors have further identified the need to specify performance requirements for enhanced FR2 UEs supporting up to 4 DL MIMO layers with dual TCI with different downlink signals, e.g., on a single component carrier. The inventors have further identified the need to identify demodulation requirements on up to 4 DL MIMO layers. The inventors have further identified the need to identify CSI requirements to support up to 4-layer with 2 TCIs and Rel-17 mTRP Type I codebook. The inventors have further identified the need to improving UE support for "simultaneousReceptionDiff-TypeD-r16" UE capability, and for 2- or 4-layer downlink MIMO reception.

Embodiments of the present disclosure relate to apparatuses, methods, and computer program products that support multi-transmission point (M-TPR) (FR2) signal to inter-layer-group interference maximization.

Embodiments of the present disclosure relate to apparatuses, methods, and computer program products that support enhanced beam handling and channel-state information (CSI) feedback, and/or the transmission to a single UE from multiple transmission points (multi-TRP) and full-power transmission from multiple UE antennas in the uplink (UL). These enhancements increase throughput, reduce overhead, and/or provide additional robustness. Additional mobility enhancements enable reduced handover delays, in particular when applied to beam-management mechanisms used for deployments in millimeter (mm) wave bands.

Embodiments of the present disclosure relate to apparatuses, methods, and computer program products that support M-TRP FR2 signal to inter-layer-group interference maximization via user equipment HAD beam control.

Embodiments of the present disclosure relate to apparatuses, methods, and computer program products that support user equipment in the performance of beam refinement, e.g., discovering and shaping its best narrow beams to optimize FR2 DL multi-layer reception with 2 TRP and 2 TCI/DCIs received on a same, single UE panel (e.g., mmWave antenna array module) but different UBAs of the same panel.

Embodiments of the present disclosure relate to apparatuses, methods, and computer program products that support user equipment in steering its Rx spatial filters in order to maximize the per UBA Signal to inter-layer-group-interference resulting in maximizing the DL BLER performance per layer-group as well as the reported CQI per layer-group.

Some embodiments of the present disclosure will now be described more fully hereinafter with reference to the accompanying drawings, in which some, but not necessarily all, embodiments of the present disclosure are shown. Indeed, various embodiments of the present disclosure can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with certain embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "go-between," and similar terms can be used interchangeably to refer to computers connected via, or programs running on, a network or plurality of networks capable of data creation, modification, deletion, transmission, receipt, and/or storage in accordance with an example embodiment of the present disclosure.

Additionally, as used herein, the terms "user equipment," "user device," "device," "apparatus," "mobile device," "personal computer," "laptop computer," "laptop," "desktop computer," "desktop," "mobile phone," "tablet," "smartphone," "smart device," "cellphone," "computing device," "communication device," "user communication device," "terminal," and similar terms can be used interchangeably to refer to an apparatus, such as may be embodied by a computing device, configured to access a network or plurality of networks for at least the purpose of wired and/or wireless transmission of communication signals in accordance with certain embodiments of the present disclosure.

Additionally, as used herein, the terms "network," "serving network," and similar terms can be used interchangeably to refer to an end to end logical communication network, or portion thereof (e.g., a network slice), such as a Public Land Mobile Network (PLMN) (e.g., Home Public Land Mobile Network (HPLMN), Visited Public Land Mobile Network (VPLMN), or the like), Stand-Alone Non-Public Network (SNPN), a Public Network Integrated NPN (PNI-NPN), and/or a radio access network communicably connected thereto.

As used herein, a "computer-readable storage medium," which refers to a non-transitory physical storage medium (e.g., volatile or non-volatile memory device), can be differentiated from a "computer-readable transmission medium," which refers to an electromagnetic signal. Such a storage medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc (BD), the like, or combinations thereof), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where certain embodiments are described to use a computer-readable storage medium, other types of computer-readable mediums can be substituted for or used in addition to the computer-readable storage medium in alternative embodiments.

In the following, certain embodiments are explained with reference to communication devices capable of communication via a wired and/or wireless network and communication systems serving such communication devices. Before explaining in detail certain example embodiments, certain general principles of a wired and/or wireless communication system, access systems thereof, and communication devices are briefly explained with reference to FIGS. 1-4 to assist in understanding the technology underlying the described examples.

According to some embodiments, a communication device or terminal can be provided for wireless access via cells, base stations, access points, the like (e.g., wireless transmitter and/or receiver nodes providing access points for a radio access communication system and/or other forms of wired and/or wireless networks), or combinations thereof. Such wired and/or wireless networks include, but are not limited to, networks configured to conform to 2G, 3G, 4G, LTE, 5G, and/or any other similar or yet to be developed future communication network standards. The present disclosure contemplates that any methods, apparatuses, computer program codes, and any portions or combination thereof can also be implemented with yet undeveloped communication networks and associated standards as would be developed in the future and understood by one skilled in the art in light of the present disclosure.

Access points and hence communications there through are typically controlled by at least one appropriate control apparatus so as to enable operation thereof and management of mobile communication devices in communication therewith. In some embodiments, a control apparatus for a node can be integrated with, coupled to, and/or otherwise provided for controlling the access points. In some embodiments, the control apparatus can be arranged to allow communications between a user equipment and a core network or a network entity of the core network. For this purpose, the control apparatus can comprise at least one memory, at least one data processing unit such as a processor or the like, and an input/output interface (e.g., global positioning system receiver/transmitter, keyboard, mouse, touchpad, display, universal serial bus (USB), Bluetooth, ethernet, wired/wireless connections, the like, or combinations thereof).

Moreover, via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions can be distributed between several control units. In some embodiments, each base station can comprise a control apparatus. In alternative embodiments, two or more base stations can share a control apparatus.

Access points and associated controllers can communicate with each other via a fixed line connection and/or via a radio interface. The logical connection between the base station nodes can be provided for example by an X2 interface, an S1 interface, a similar interface, or combinations thereof. This interface can be used for example for coordination of operation of the stations and performing reselection or handover operations. The logical communication connection between the initial communication node and the final communication node of the network can comprise a plurality of intermediary nodes. Additionally, any of the nodes can be added to and removed from the logical communication connection as required to establish and maintain a network function communication.

The communication device or user equipment can comprise any suitable device capable of at least receiving a communication signal comprising data. The communication signal can be transmitted via a wired connection, a wireless connection, or combinations thereof. For example, the device can be a handheld data processing device equipped with radio receiver, data processing and user interface apparatus. Non-limiting examples include a mobile station (MS) such as a mobile phone or what is known as a 'smart phone,' a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, earpieces with wireless connectivity, jewelry and so on, Universal Serial Bus (USB) sticks with wireless capabilities, modem data cards, machine type devices or any combinations of these or the like.

In some embodiments, a communication device, e.g., configured for communication with the wireless network or a core network entity, can be exemplified by a handheld or otherwise mobile communication device or user equipment. A mobile communication device can be provided with wireless communication capabilities and appropriate electronic control apparatus for enabling operation thereof. Thus, the communication device can be provided with at least one data processing entity, for example a central processing unit and/or a core processor, at least one memory and other possible components such as additional processors and memories for use in software and hardware aided execution of tasks it is designed to perform. The data processing, storage, and other relevant control apparatus can be provided on an appropriate circuit board and/or in chipsets.

Data processing and memory functions provided by the control apparatus of the communication device are configured to cause control and signaling operations in accordance with certain embodiments as described later in this description. A user can control the operation of the communication device by means of a suitable user interface such as touch sensitive display screen or pad and/or a keypad, one or more actuator buttons, voice commands, combinations of these, or the like. A speaker and a microphone are also typically provided. Furthermore, a mobile communication device can comprise appropriate connectors (either wired or wireless) to other devices and/or for connecting external accessories, for example hands-free equipment, thereto.

In some embodiments, a communication device can communicate wirelessly via one or more appropriate apparatuses for receiving and transmitting signals (e.g., global positioning system receiver/transmitter, remote touchpad interface with remote display, Wi-Fi interface, etc.). In some embodiments, a radio unit can be connected to the control apparatus of the device. The radio unit can comprise a radio part and associated antenna arrangement. The antenna arrangement can be arranged internally or externally to the communication device.

Turning now to FIG. 1, examples of an apparatus 100 that may be embodied by the user equipment or by a network entity, such as server or other computing device are depicted in accordance with an example embodiment of the present disclosure. As described below in conjunction with the flowcharts and block diagrams presented herein, the apparatus 100 of an example embodiment can be configured to perform the functions described herein. In any instance, the apparatus 100 can more generally be embodied by a computing device, such as a server, a personal computer, a computer workstation or other type of computing device including those functioning as a user equipment and/or a component of a wireless network or a wireless local area network. Regardless of the manner in which the apparatus 100 is embodied, the apparatus 100 of an example embodiment can be configured as shown in FIG. 1 so as to include, be associated with or otherwise be in communication with a processor 102 and a memory device 104 and, in some embodiments, a communication interface 106.

Although not illustrated, the apparatus 100 of an example embodiment may also optionally include a user interface, such as a touch screen, a display, a keypad, the like, or combinations thereof. Moreover, the apparatus 100 according to an example embodiment can be configured with a global positioning circuit that comprises a global positioning receiver and/or global positioning transmitter configured for communication with one or more global navigation satellite systems (e.g., GPS, GLONASS, Galileo, the like, or combinations thereof). The global positioning circuit may be configured for the transmission and/or receipt of direct/indirect satellite and/or cell signals in order to determine geolocation data (e.g., latitude, longitude, elevation, altitude, geographic coordinates, the like, or combinations thereof) for the apparatus 100 and/or another communication device associated with the apparatus 100 or the one or more global navigation satellite systems.

In some embodiments, geolocation data may comprise a time dimension, such as a time stamp that associates the geolocation data with a respective time (e.g., 01:00 AM EST, etc.), a respective date (e.g., Sep. 26, 2020, etc.), and/or the like. The time dimension may be configured based on one or more of a time of receipt, generation, transmission, and/or the like (e.g., by the apparatus). In some embodiments, geolocation data may be associated with one or more time dimensions.

The processor 102 (and/or co-processors or any other circuitry assisting or otherwise associated with the processor) can be in communication with the memory device 104 via a bus for passing information among components of the apparatus 100. The memory device 104 can include, for example, one or more volatile and/or non-volatile memories, such as a non-transitory memory device. In other words, for example, the memory device 104 can be an electronic storage device (e.g., a computer readable storage medium) comprising gates configured to store data (e.g., bits) that can be retrievable by a machine (e.g., a computing device like the processor). The memory device 104 can be configured to store information, data, content, applications, instructions, the like, or combinations thereof for enabling the apparatus 100 to carry out various functions in accordance with an example embodiment. For example, the memory device 104 could be configured to buffer input data for processing by the processor 102. Additionally or alternatively, the memory device 104 could be configured to store instructions for execution by the processor 102.

The apparatus 100 can, in some embodiments, be embodied in various computing devices as described above. However, in some embodiments, the apparatus 100 can be embodied as a chip or chip set. In other words, the apparatus 100 can comprise one or more physical packages (e.g., chips) including materials, components and/or wires on a structural assembly (e.g., a baseboard). The structural assembly can provide physical strength, conservation of size, and/or limitation of electrical interaction for component circuitry included thereon. The apparatus 100 can therefore, in some cases, be configured to implement an embodiment of the present disclosure on a single chip or as a single "system on a chip." As such, in some cases, a chip or chipset can constitute means for performing one or more operations for providing the functionalities described herein.

The processor 102 can be embodied in a number of different ways. For example, the processor 102 can be embodied as one or more of various hardware processing means such as a coprocessor, a microprocessor, a controller, a Digital Signal Processor (DSP), a processing element with or without an accompanying DSP, or various other circuitry including integrated circuits such as, for example, an Application Specific Integrated Circuit (ASIC), a Field Programmable Gate Array (FPGA), a Micro-Controller Unit (MCU), a hardware accelerator, a special-purpose computer chip, or the like. As such, in some embodiments, the processor 102 can include one or more processing cores configured to perform independently. A multi-core processor can enable multiprocessing within a single physical package. Additionally or alternatively, the processor 102 can include one or more processors configured in tandem via the bus to enable independent execution of instructions, pipelining and/or multithreading.

In an example embodiment, the processor 102 can be configured to execute instructions stored in the memory device 104 or otherwise accessible to the processor. Alternatively or additionally, the processor 102 can be configured to execute hard coded functionality. As such, whether configured by hardware or software methods, or by a combination thereof, the processor 102 can represent an entity (e.g., physically embodied in circuitry) capable of performing operations according to an embodiment of the present disclosure while configured accordingly. Thus, for example, when the processor 102 is embodied as an ASIC, FPGA, the like, or combinations thereof the processor 102 can be specifically configured hardware for conducting the operations described herein.

Alternatively, as another example, when the processor 102 is embodied as an executor of instructions, the instructions can specifically configure the processor 102 to perform the algorithms and/or operations described herein when the instructions are executed. However, in some cases, the processor 102 can be of a specific device (e.g., an encoder and/or a decoder) configured to employ an embodiment of the present disclosure by further configuration of the processor 102 by instructions for performing the algorithms and/or operations described herein. The processor 102 can include, among other things, a clock, an Arithmetic Logic Unit (ALU) and logic gates configured to support operation of the processor 102.

In some embodiments, the communication interface 106 can be any means such as a device or circuitry embodied in either hardware or a combination of hardware and software that is configured to receive and/or transmit data from/to a network and/or any other device or module in communication with the apparatus 100, such as network functions, network repository functions, a base station, an access point, service communication proxies, a radio access network, core network services, a database or other storage device, the like, or combinations thereof. In this regard, the communication interface can include, for example, one or more antennas and supporting hardware and/or software for enabling communications with a wireless communication network. Additionally or alternatively, the communication interface can include the circuitry for interacting with the one or more antennas to cause transmission of signals via the one or more antennas or to handle receipt of signals received via the one or more antennas.

In some embodiments, the one or more antennas may comprise one or more of a dipole antenna, monopole antenna, helix antenna, loop antenna, waveguide, horn antenna, parabolic reflectors, corner reflectors, dishes, micro strip patch array, convex-plane, concave-plane, convex-convex, concave-concave lenses, the like or combinations thereof. In some environments, the communication interface can alternatively or additionally support wired communication. As such, for example, the communication interface can include a communication modem and/or other hardware/software for supporting communication via cable, Digital Subscriber Line (DSL), USB, the like or combinations thereof.

In some embodiments, a session management function (e.g., an SMF) can comprise a 5GC session management function for any suitable Control and User Plane Separation (CUPS) architecture, such as for the General Packet Radio Service (GPRS), Gateway GPRS Support Node Control plane function (GGSN-C), Trusted Wireless Access Gateway Control plane function (TWAG-C), Broadband Network Gateway Control and User Plane Separation (BNG-CUPS), N4 interface, Sxa interface, Sxb interface, Sxc interface, Evolved Packet Core (EPC) Serving Gateway Control plane function (SGW-C), EPC Packet Data Network Gateway Control plane function (PGW-C), EPC Traffic Detection Control plane function (TDF-C), the like, or combinations thereof.

In some embodiments, the processor 102, in communication with the memory 104, can be configured to provide signals to and receive signals from the communication interface 106. In some embodiments, the communication interface 106 can include a transmitter and a receiver. In some embodiments, the processor 102 can be configured to control the functioning of the apparatus 100, at least in part. In some embodiments, the processor 102 can be configured to control the functioning of the transmitter and receiver by effecting control signaling via electrical leads to the transmitter and receiver. Likewise, the processor 102 can be configured to control other elements of apparatus 100 by effecting control signaling via electrical leads connecting the processor 102 to the other elements, such as a display or the memory 104.

The apparatus 100 can be capable of operating with one or more air interface standards, communication protocols, modulation types, access types, and/or the like. Signals sent and received by the processor 102 can include signaling information in accordance with an air interface standard of an applicable cellular system, and/or any number of different wireline or wireless networking techniques, comprising but not limited to Wi-Fi, Wireless Local Access Network (WLAN) techniques, such as Institute of Electrical and Electronics Engineers (IEEE) 802.11, 802.16, 802.3, Asymmetric Digital Subscriber Line (ADSL), Data Over Cable Service Interface Specification (DOCSIS), the like, or combinations thereof. In addition, these signals can include speech data, user generated data, user requested data, the like, or combinations thereof.

For example, the apparatus 100 and/or a cellular modem therein can be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, Session Initiation Protocol (SIP)), the like, or combinations thereof. For example, the apparatus 100 can be capable of operating in accordance with 2G wireless communication protocols Interim Standard (IS) 136 (IS-136), Time Division Multiple Access (TDMA), GSM, IS-95, Code Division Multiple Access, Code Division Multiple Access (CDMA), the like, or combinations thereof. In addition, for example, the apparatus 100 can be capable of operating in accordance with 2.5G wireless communication protocols GPRS, Enhanced Data GSM Environment (EDGE), the like, or combinations thereof.

Further, for example, the apparatus 100 can be capable of operating in accordance with 3G wireless communication protocols, such as UMTS, Code Division Multiple Access 2000 (CDMA2000), Wideband Code Division Multiple Access (WCDMA), Time Division-Synchronous Code Division Multiple Access (TD-SCDMA), the like, or combinations thereof. The apparatus 100 can be additionally capable of operating in accordance with 3.9G wireless communication protocols, such as Long Term Evolution (LTE), Evolved Universal Terrestrial Radio Access Network (E-UTRAN), the like, or combinations thereof.

Additionally, for example, the apparatus 100 can be capable of operating in accordance with 4G wireless communication protocols, such as LTE Advanced, 5G, and/or the like as well as similar wireless communication protocols that can be subsequently developed. In some embodiments, the apparatus 100 can be capable of operating according to or within the framework of any suitable CUPS architecture, such as for the gateway GGSN-C, TWAG-C, Broadband Network Gateways (BNGs), N4 interface, Sxa interface, Sxb interface, Sxc interface, EPC SGW-C, EPC PGW-C, EPC TDF-C, the like, or combinations thereof. Indeed, although described herein in conjunction with operation with a 5G system, the apparatus and method may be configured to operate in conjunction with a number of other types of systems including systems hereinafter developed and implemented.

Some of the example embodiments disclosed herein can be implemented in software, hardware, application logic, or a combination of software, hardware, and application logic. The software, application logic, and/or hardware can reside on memory 104, the processor 102, or electronic components, for example. In some example embodiments, the application logic, software or an instruction set is maintained on any one of various conventional computer-readable media. In the context of this document, a "computer-readable medium" can be any non-transitory media that can contain, store, communicate, propagate or transport the instructions for use by or in connection with an instruction execution system, apparatus, or device, such as a computer or data processor circuitry, with examples depicted at FIG. 1. The computer-readable medium can comprise a non-transitory computer-readable storage medium that can be any media that can contain or store the instructions for use by or in connection with an instruction execution system, apparatus, or device, such as a computer.

In some embodiments, the apparatus 100 can comprise receiver circuitry 108. The receiver circuitry 108 may be configured at least to operate as a receiver. In some examples, but not necessarily all examples the receiver circuitry 108 is configured at least to operate as a transceiver that is, as a receiver and as a transmitter.

In some embodiments, the receiver circuitry 108 can be or comprise a printed circuit board, one or more directional antennas, an antenna array, and/or the like. In some embodiments, antennas/antenna arrays can have or create radiation patterns that cover a respective plurality of partially overlapping sectors that extend outwardly from the receiver circuitry 108.

The directional antennas have direction because their radiation patterns are spatially asymmetric. This radiation pattern has a front or main lobe(s) in the forward (boresight) direction, side lobe(s) and back lobe(s). The front/main lobe(s) extend away from a perimeter of the receiver circuitry 108 in boresight from each individual antenna to form a 'beam'.

The radiation pattern forms a beam that has a spatial spread. In this example the spread of the radiation pattern, parallel to the plane of the circuit board, may be greater than 45°. The radiation patterns from the directional antennas may meet or partially overlap to provide 360° coverage parallel to the plane of the receiver circuitry 108 of the processor 102.

In some embodiments, the receiver circuitry 108 can comprise a circuit board that is octagonal. This shape is optional. In some embodiments, directional antennas may be placed at or near an exterior perimeter of the receiver circuitry 108 of the processor 102.

In the example illustrated the directional antennas provide 360° coverage. This is optional. In the example illustrated there are eight directional antennas, this is optional. In the example illustrated the directional antennas are the same except for orientation, this is optional.

In some examples, but not necessarily all examples there are N directional antennas, each of which has a radiation pattern (beam) that covers a segment that subtends, at a common origin, an angle greater than 360°/N at a defined distance from the origin. In some examples, N is between 4 and 12. In some examples, but not necessarily all examples the arrangement of N directional antennas, has N-fold rotation symmetry about an axis that is orthogonal to a plane of the receiver circuitry 108 of the processor 102 or a component thereof (e.g., a planar printed circuit board) and that passes through the common origin, i.e., the arrangement is invariant under a rotation of 360°/N about that origin.

The N directional antennas can be arranged such that they are located and oriented relative to one another to provide a plurality of antennas that form a suitable shape such as hexagon, octagon, hexa decagon, equiangular polygon, square, circle. For example, if omnidirectional coverage is required, the N directional antennas can be arranged in any suitable shape that provides omnidirectional coverage.

The processor 102 can be configured for controlling a discovery process for discovering availability of multiple radio links. The processor 102 can be configured to receive a plurality of quality measurements for signals received via the respective plurality of directional antennas. The processor 102 can be configured to select one or more directional antennas 40 for communicating data via one or more radio links based on the plurality of quality measurements.

Thus, the receiver circuitry 108 can comprise a plurality of directional antennas (not shown) that have radiation patterns that cover a respective plurality of partially overlapping sectors that extend outwardly. The processor 102 or the receiver circuitry 108 can be configured for carrying out a discovery process for discovering availability of multiple radio links. The processor 102 or the receiver circuitry 108 can be configured to determine or receive a plurality of quality measurements for signals received via respective antennas of the plurality of directional antennas. The processor 102 or the receiver circuitry 108 can be configured to select one or more directional antennas or communicating data via radio links based on the plurality of quality measurements. The processor 102 or the receiver circuitry 108 can be configured to select, e.g., a mmWave antenna array module (not shown) of the apparatus 100 for simultaneous reception of different downlink signals from one or more transmission points.

In the example illustrated, apparatus 100 is described as being distinct and different from a transmission point, relay station, eNb, gNb, access point, access network, and/or the like. However, in some embodiments, the apparatus 100 can operate as any or all of a transmission point, relay station, eNb, gNb, access point, access network, and/or the like and/or one or more of a transmission point, relay station, eNb, gNb, access point, access network, and/or the like can operate as apparatus 100.

The presence of multiple directional antennas can, in some examples, enable transmission diversity at the apparatus 100 and/or reception diversity at the apparatus 100. The presence of multiple directional antennas can, in some examples, enable multiple input multiple output (MIMO). For example, multiple directional antennas can enable multiple input (MI) from the downlink and/or multiple output (MO) into the uplink. A single data stream can be divided across the multiple directional antennas for transmission and/or a single data stream can be created from combining data received across multiple directional antennas.

In some examples, the apparatus 100 is configured as an Ultra-Reliable Low-Latency Communication (URLLC) apparatus that is capable of multiple parallel connections (good reliability) using 240 kHz or 120 kHz sub carrier spacing (low latency). For example, the apparatus 100 can be configured to satisfy one or more of requirements, such as a communication service availability target, a transfer interval target, an apparatus speed, a number of apparatuses/UE, a service area, and/or the like.

The apparatus 100 may operate with high reliability (≥99.999%).

The apparatus 100 may operate with low latency (≤2 ms).

The apparatus 100 may operate while moving at speed (≤75 km/h).

The apparatus 100 may operate in the presence of multiple other apparatuses (≤100) over a large area (5000 m$^2$). The other apparatuses can be stationary or moving.

The density of other apparatus can be large, e.g., 1 per 50-250 m$^2$.

The use of directional antennas may increase a communication range in a particular direction. However, directional antennas (and their beams) make the communication more sensitive to physical obstacles, so communication links might drop significantly or even break if there is no line-of-sight between transmitter and receiver. Such a drop in quality might happen very suddenly in a dynamic environment where either the apparatus or potential obstacles (e.g., other user equipment, or other objects) are moving.

The apparatus 100 can, in some examples, move by translation and/or rotation. The translation can be in one, two or three dimensions (x, y, z). The rotation can be in one or two orthogonal directions, e.g., azimuthal angle and elevation angle. It can be desirable to provide 360° coverage in the plane of relative translational movement. This can increase the likelihood of there being one or more available links.

The number of simultaneous links the apparatus 100 maintains (reliability target) can be dependent on a current Quality of Service (QoS) requirement and may be one, two, or more links.

The apparatus 100 may enable fast discovery of available relay stations and suitable links. This allows the apparatus 100 to maintain the number of active links needed to fulfil its reliability target. The discovery process is managed by the apparatus 100 exploiting local measurements and knowledge of detected relay stations and the environment. This makes discovery and selection of links fast and more reliable. The discovery process may not require excessive signaling but supports very fast and agile hand over and discovery processes.

In some embodiments, the processor 102 or the receiver circuitry 108 can be configured to receive a plurality of quality measurements for signals received via the respective plurality of directional antennas and is configured to select one or more directional antennas for communicating data via one or more radio links based on the plurality of quality measurements.

In at least some examples, the quality measurements for signals received are received signal strength measurement or parameters dependent upon received signal strength measurements.

For example, the quality measurements could be, for example, receiver signal power, signal strength, reference signal receive power (RSRP), received signal strength indication (RSSI), reference signal receive quality (RSRQ), signal to interference plus noise ratio (SNIR), other suitable quality measurements known to those of skill in the art, combinations thereof, and/or the like.

The processor 102 and/or the receiver circuitry 108 (e.g., including the directional antennas) may be configured to operate in one or more operational resonant frequency bands. For example, the operational frequency bands may include (but are not limited to) the bands specified in the current release of 3GPP TS 38.101.

A frequency band over which the receiver circuitry 108 (e.g., including the directional antennas) can efficiently operate is a frequency range where the receiver circuitry 108 (e.g., including the directional antennas) return loss ($-20 \log_{10}|S11|$) is more negative than an operational threshold and insertion loss ($-20 \log_{10}|S21|$) is less negative than an operational threshold value.

As used here 'module' refers to a unit or apparatus that excludes certain parts/components that would be added by an end manufacturer or a user. The processor 102 can be a module. The receiver circuitry 108 can be a module. The plurality of direction antennas/antenna array can be a module.

The processor 102 can be a controller. The processor 102 can be implemented in hardware alone, have certain aspects in software including firmware alone or can be a combination of hardware and software (including firmware).

The processor 102 can be implemented using instructions that enable hardware functionality, for example, by using executable instructions, for example of a computer program, in a general-purpose or special-purpose processor that may be stored on a computer readable storage medium (disk, memory, etc.) to be executed by such a processor.

The processor 102 can be configured to read from and write to the memory 104. The processor 102 can also comprise an output interface via which data and/or commands are output by the processor and an input interface via which data and/or commands are input to the processor 102.

The memory 104 can store instructions (e.g., as program codes, computer program codes) that controls the operation of the apparatus 100 when loaded into the processor. The instructions stored in the memory 104, e.g., instructions of a computer program, provide the logic and routines that enables the apparatus 100 to perform the methods illustrated and described. The processor 102, by reading the memory 104, is able to load and execute the instructions.

The apparatus 100 can therefore comprise: at least one processor; and at least one memory including program codes (i.e., computer program codes, computer program instructions, computer-readable instructions, program instructions, etc.), wherein the at least one memory and the program codes/computer program codes are configured to, with the at least one processor, cause the apparatus 100 at least to perform any of the approaches, methods, signaling flows, communication approaches, receiver filter steering steps, or other method substeps described herein.

In some embodiments, the apparatus 100 can comprise: at least one processor; and at least one memory storing instructions that, when executed by the at least one processor, cause the apparatus at least to: determine that two or more different downlink signals received simultaneously from two or more different transmission points should be received on a single mmWave antenna array module of the apparatus, wherein respective downlink signals of the two or more different downlink signals comprise one or two layers per signal carrying the transmission configuration indicator, TCI, at least one downlink control information, and one or more channel state information per transmission point, and wherein respective downlink signals of the two or more different downlink signals further comprise one or more TCIs, respective TCIs having a respective TCI state. In some embodiments, the apparatus 100 can be further configured to: receive, simultaneously, on the single mmWave antenna array module of the apparatus, the two or more different downlink signals from the two or more different transmission points. In some embodiments, the apparatus 100 can be further configured to: steer one or more receiver spatial filters in order to maximize a signal to inter-layer-group-interference, SILGI, ratio, the SILGI ratio being a ratio of a unique beamforming array, UBA, desired signal to inter-layer-group-interference.

The instructions, e.g. the computer program can arrive at the apparatus 100 via any suitable delivery mechanism. The delivery mechanism may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program. The delivery mechanism may be a signal configured to reliably transfer the computer program. The apparatus 100 may propagate or transmit the computer program as a computer data signal.

The instructions described herein can include computer program instructions for causing an apparatus (e.g., 100) to perform some or all of the steps of any of the approaches, methods, signaling flows, communication approaches, receiver filter steering steps, or other method substeps described herein.

The computer program instructions may be comprised in a computer program, a non-transitory computer readable medium, a computer program product, a machine readable medium. In some but not necessarily all examples, the computer program instructions may be distributed over more than one computer program.

The memory 104 can be implemented as one or more separate components/circuitry some or all of which may be integrated/removable and/or may provide permanent/semi-permanent/dynamic/cached storage.

The processor 102 can be implemented as one or more separate components/circuitry some or all of which may be integrated/removable. The processor 102 may be a single core or multi-core processor.

Figure 2:
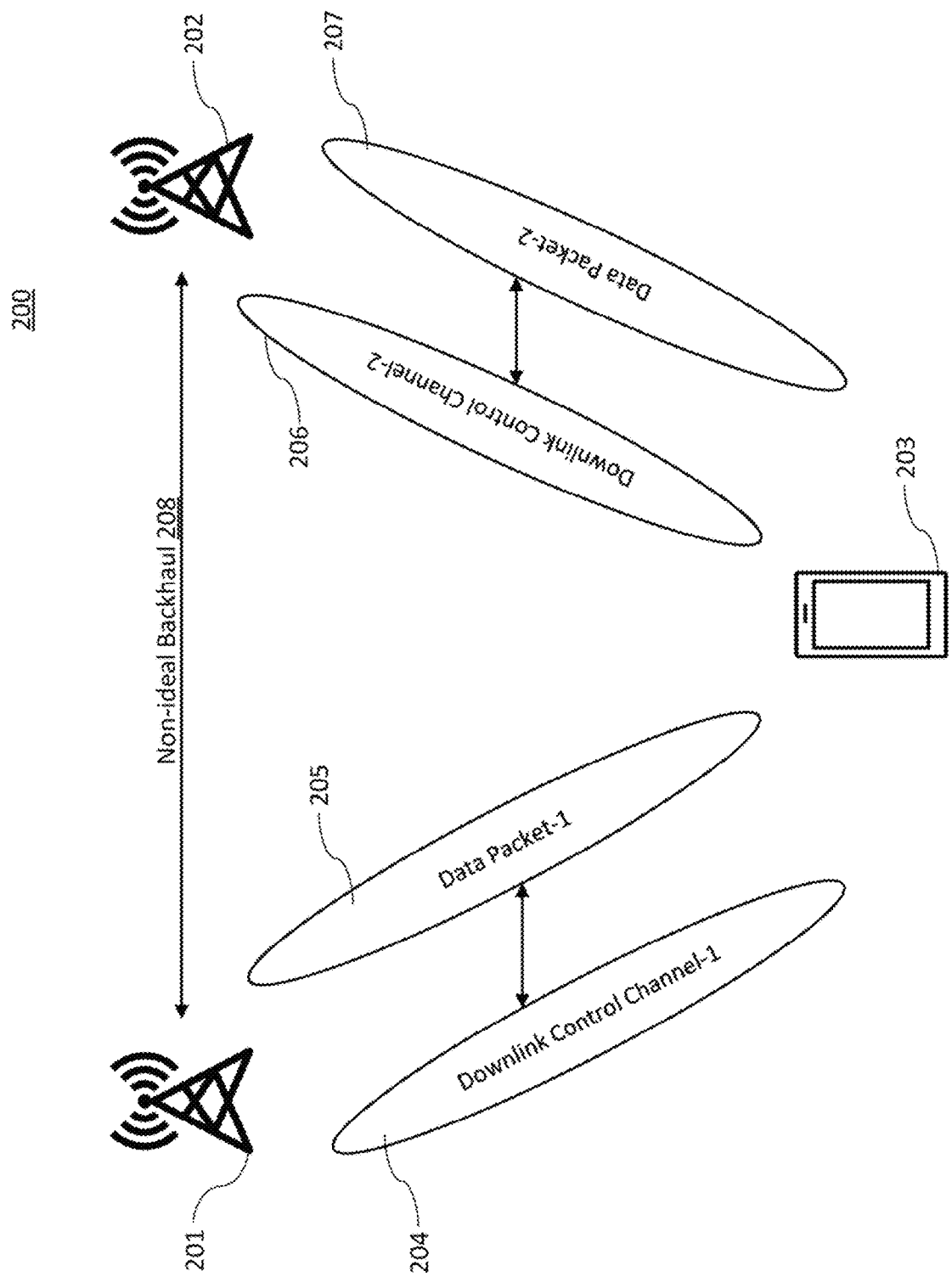
FIG. 2 shows an example communication system, according to some embodiments.

Referring now to FIG. 2, a communication system 200 is illustrated in which multiple transmission points 201, 202 can transmit simultaneously towards a user equipment 203 (UE 203). A first transmission point 201 can transmit downlink control information (DCI) towards the UE 203 via a first downlink control channel 204 and data traffic can be transmitted from the first transmission point 201 towards the UE 203 via a first data packet channel 205. A second transmission point 202 can transmit DCI towards the UE 203 via a second downlink control channel 206 and data traffic can be transmitted from the second transmission point 202 towards the UE 203 via a second data packet channel 207. Non-ideal backhaul 208 signals can be transmitted directly between the first and second transmission points 201, 202, such as when one of the first or second transmission points 201, 202 are at an edge of the communication network 200, to connect access points/transmission points at an edge of the communication network 200 to a network core.

In such a communication network 200, or the like, assuming the UE 203 is configured to support NR FR2 CA with independent beam management (IBM) and common beam management (CBM), the UE 203 is configured for simultaneous downlink reception on different component carriers from multiple collocated and non-collocated transmission points, on different UE panels/chains. Using separate beams on different component carriers requires improved UE baseband and RF capabilities, such as multiple baseband chains and support for multiple antenna panels.

Such enhancements to enable efficient and robust (simultaneous and non-simultaneous) downlink multiple transmission point/multi-panel receiver operation by UE (e.g., 203) include the use of independent receiver beams/chains at the UE side. However, without radio frequency (RF), (RRM), or UE performance requirements being in place, there is no uniform approach, which is required for network-side predictability of beamforming performance and optimized beam pair selection.

Figure 3:
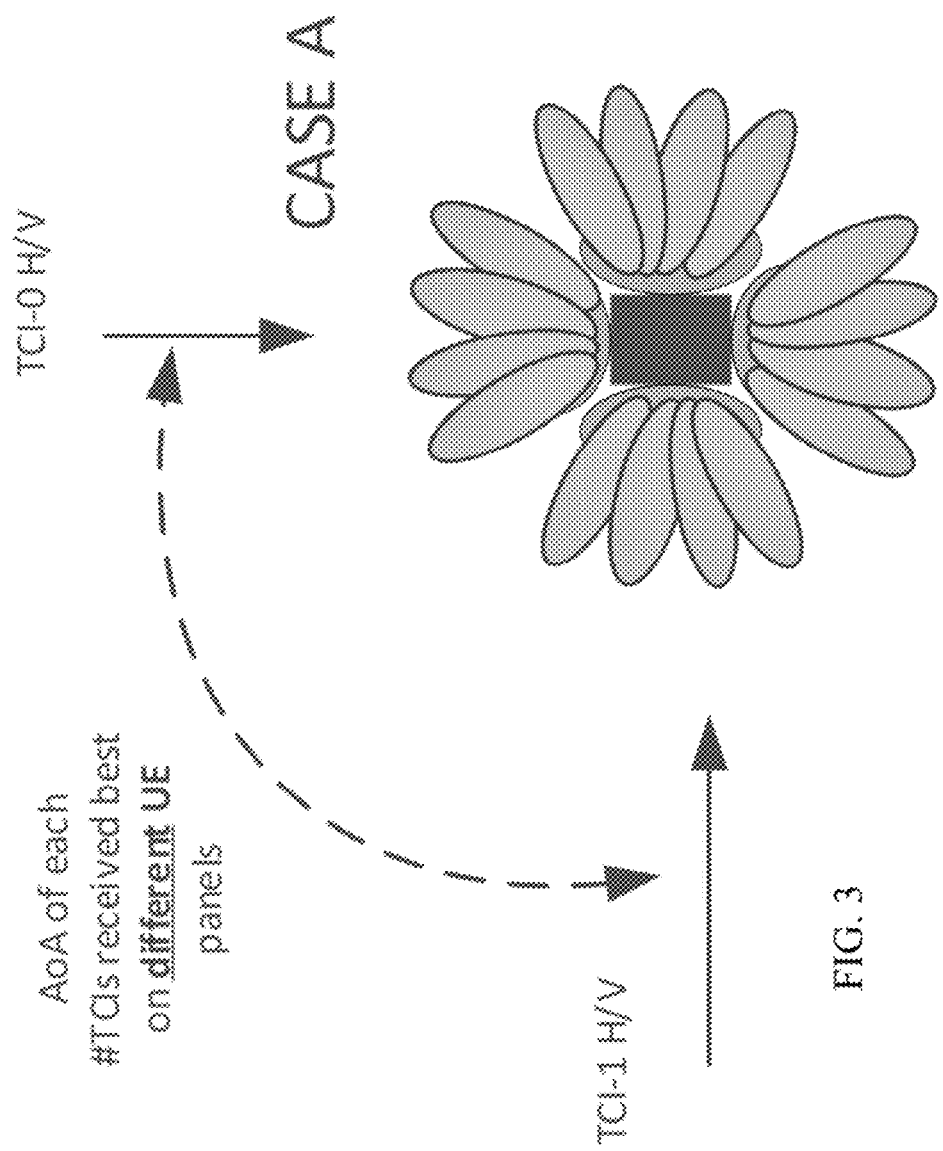
FIG. 3 shows an example signal arrival scenario.
Figure 4:
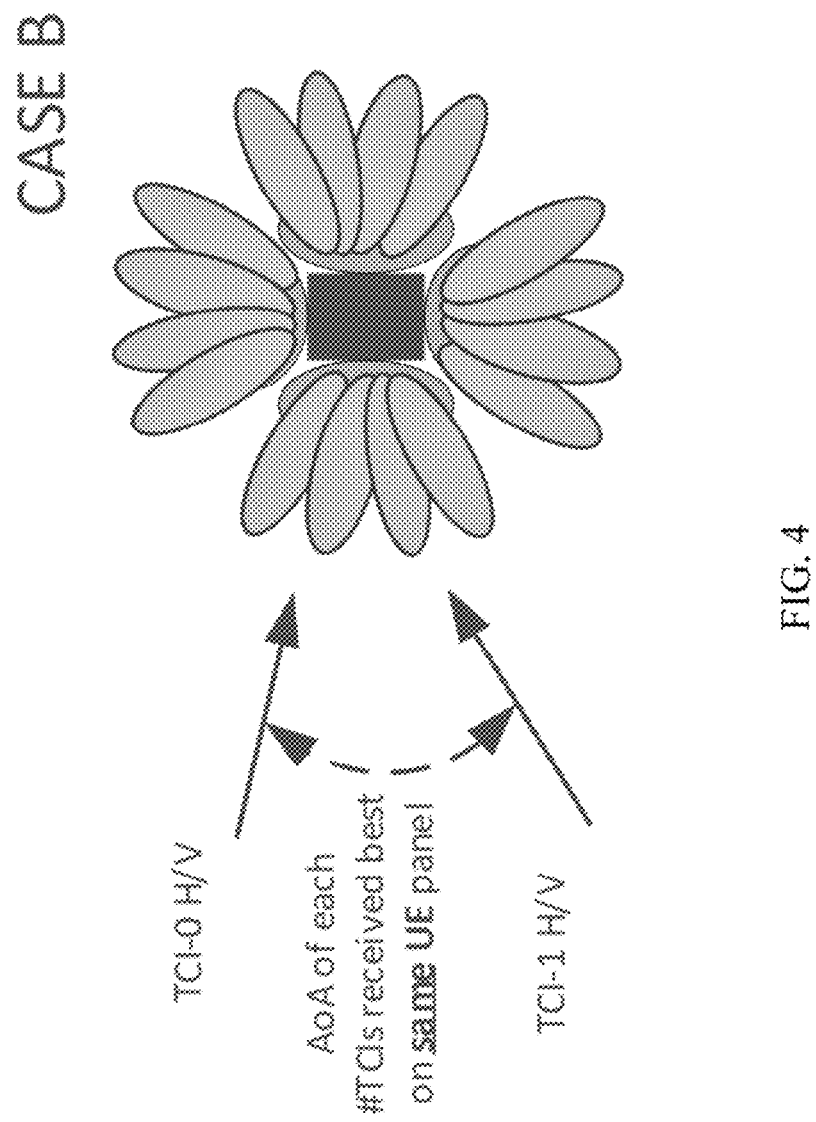
FIG. 4 shows another example signal arrival scenario.

Two non-limiting use case scenarios are presented in which radio channels between TPs and a UE have different angles of arrival/TCI, with reference to FIGS. 3 and 4, in which, respectively, the UE receives best on two different panels (case A) and the UE receives best on a single panel (case B). In both cases, the UE is assumed to be an enhanced FR2-capable UE configured for simultaneous downlink reception with two different downlink signals, e.g., TypeD RS s on a single component carrier.

In FIG. 3, it is determined based in part on the angle of arrival (AoA) of TCI-0 and TCI-1 that the TCIs would be best received on different UE panels. In FIG. 4, it is determined based in part on the AoA of TCI-0 and TCI-1 that the TCIs would be best received on a same (single) UE panel.

Figure 5:
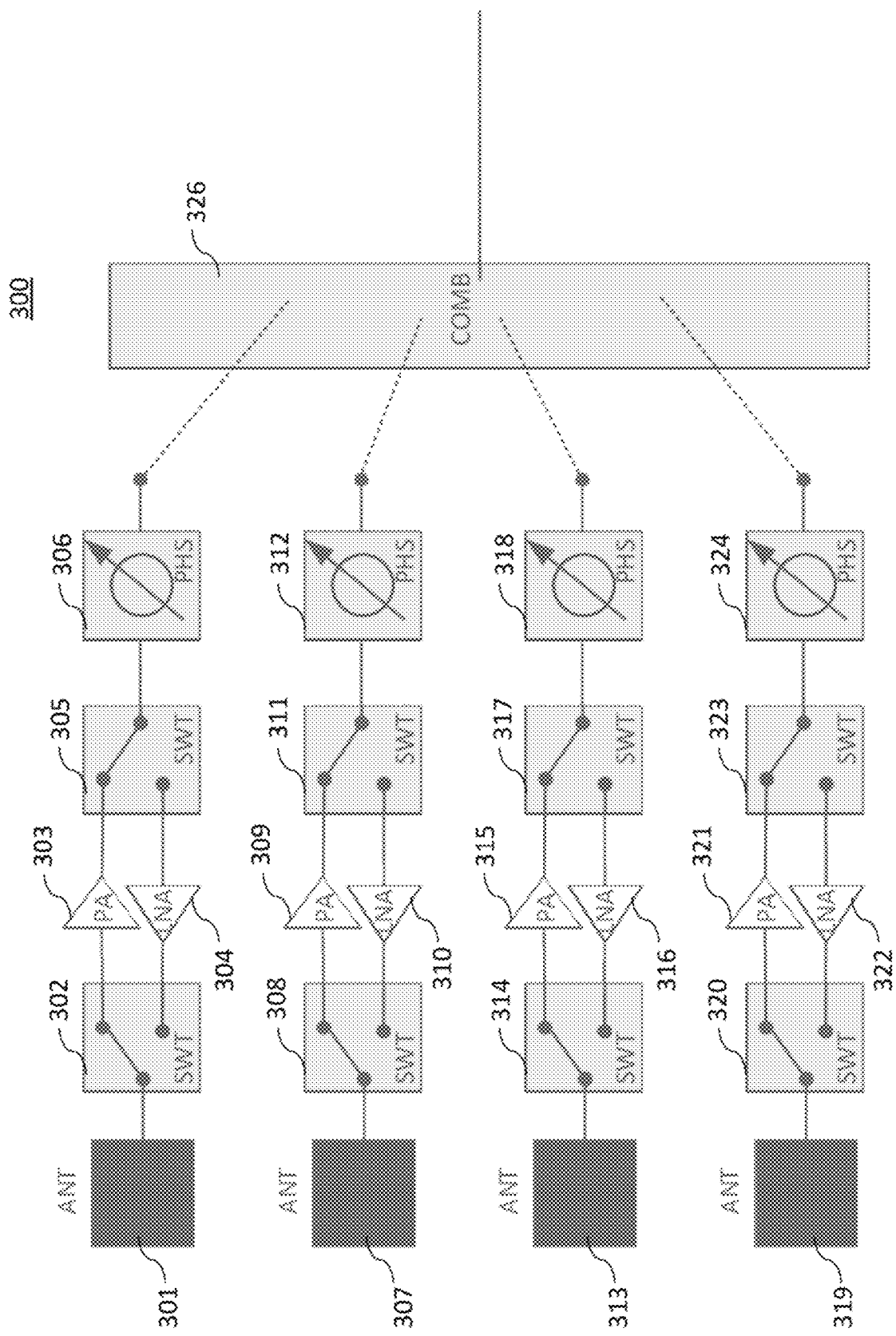
FIG. 5 shows an example transceiver architecture, according to some embodiments.

Turning now to FIG. 5, example RF front end architectures are presented as a 4 patch array with a structure covering a single polarization. Each antenna element is connected to a switch to handle the time division duplex (TDD) nature of the signal. In uplink (UL), the signal is amplified by a Power Amplifier (PA). In downlink (DL), the signal is amplified by a Low Noise Amplifier (LNA), then followed by another switch, a bi-directional phase shifter (PHS), and finally a combiner (COMB).

Figure 6:
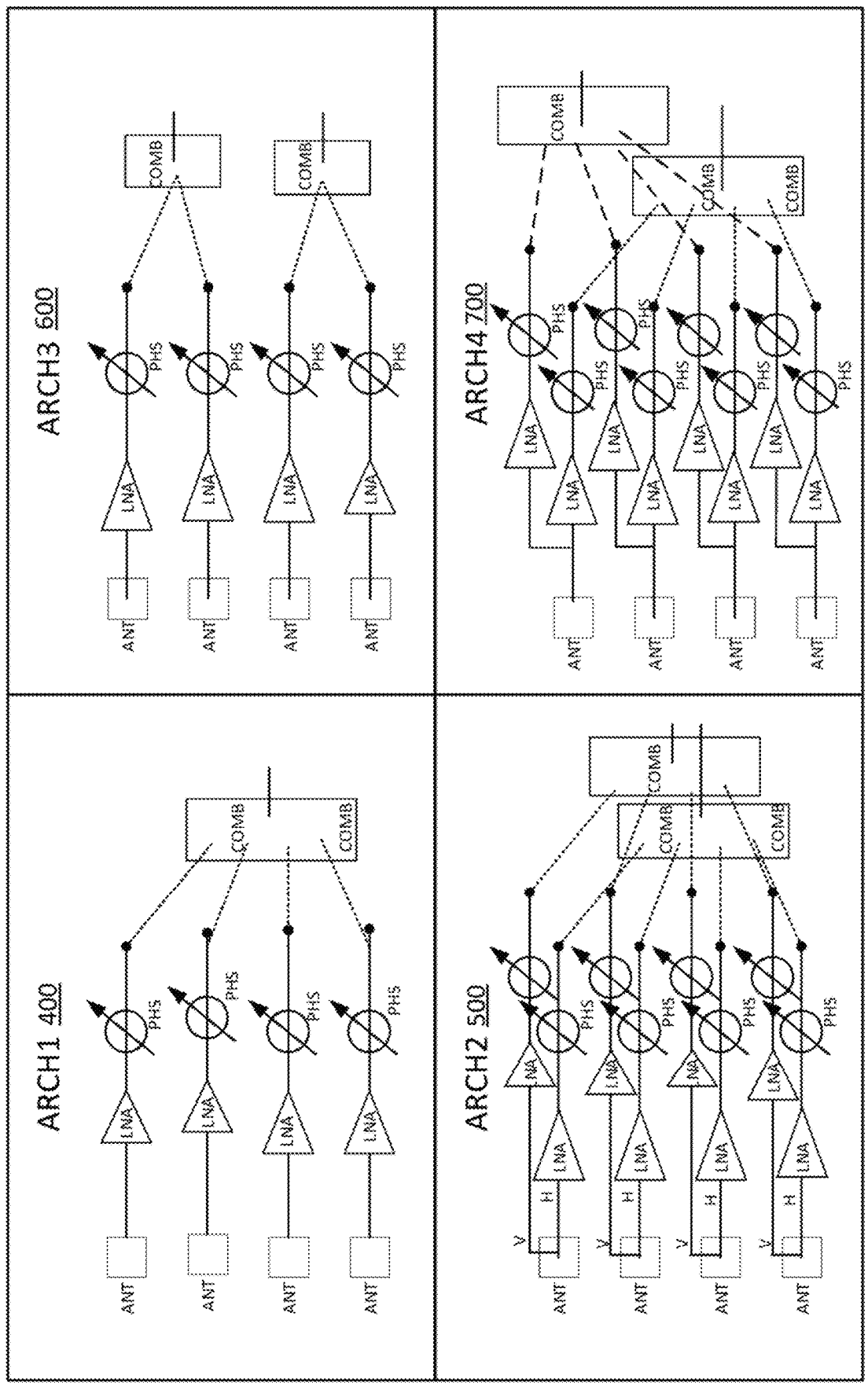
FIG. 6 shows example receiver architectures, according to some embodiments.

However, in order to simplify the discussion related to improving DL MIMO, different architectures are presented in FIG. 6, and in more detail in FIGS. 7-10, that illustrate specifically the DL part of the architecture and signal. Four example DL MIMO architectures are presented, including (1) ARCH1 400, (2) ARCH2 500, (3) ARCH3 600, and (4) ARCH4 700. By way of example only, ARCH1 400, ARCH2 500, ARCH3 600, and ARCH4 700 may be considered simplified representations for different UE mmWave RF front end architectures, with some aspects/features of the various architectures not shown for the sake of simplicity.

Figure 7:
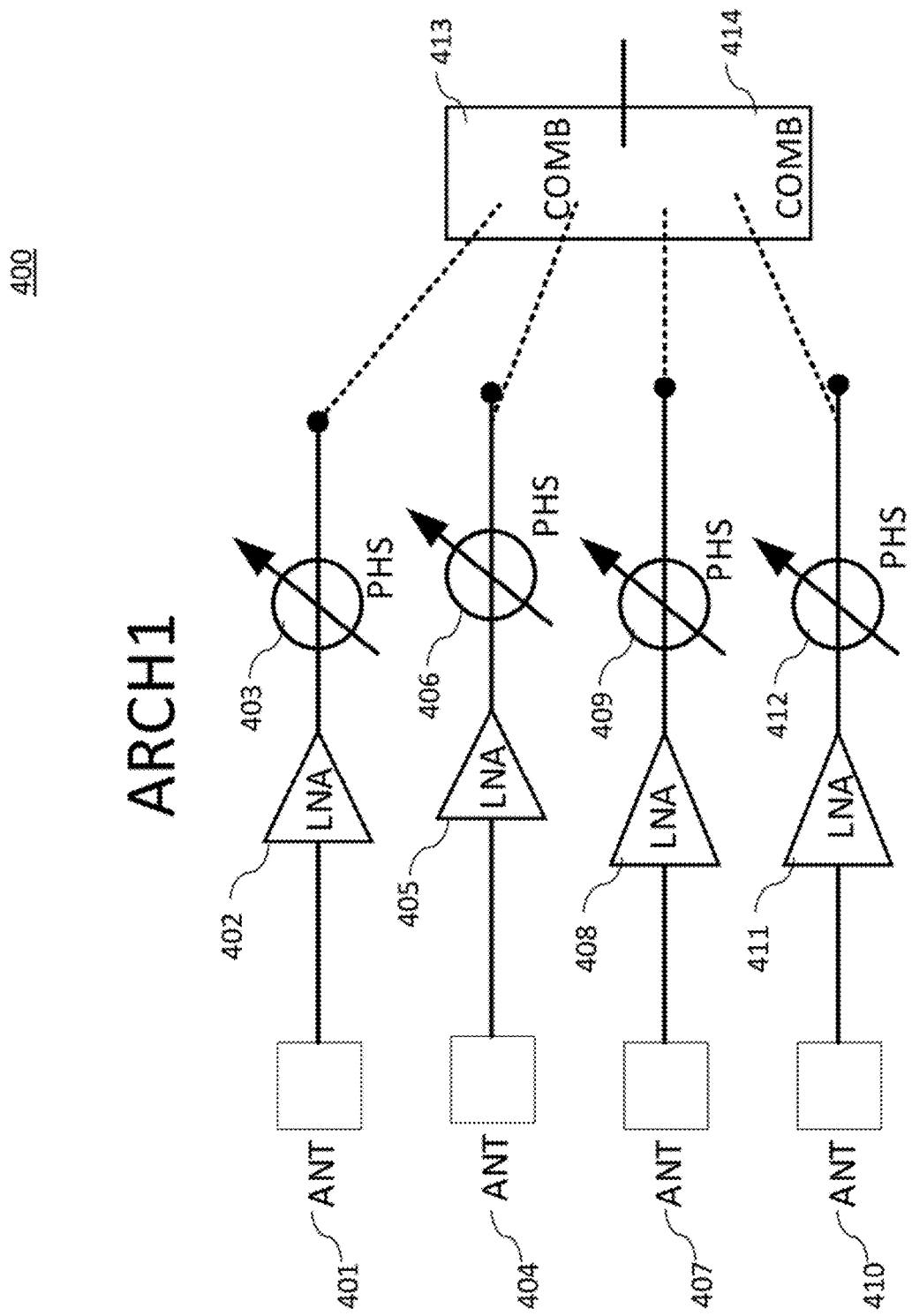
FIG. 7 shows one example of a receiver architecture, according to some embodiments.

Illustrated in more detail in FIG. 7, ARCH1 400 architecture is a simplified DL single polarization four (4) patch combined steerable array. The array of ARCH1 400 controls a single polarized beam. ARCH1 400 includes four antennas 401, 404, 407, 410, respectively coupled to four LNAs 402, 405, 408, 411. The four LNAs 402, 405, 408, 411 are coupled respectively to four PHSs 403, 406, 409, 412. The four PHSs 403, 406, 409, 412 are coupled to two combiners 413, 414, as shown in FIG. 7, such that after bi-direction phase shifting, the signal from the four antennas 401, 404, 407, 410 can be combined.

Figure 8:
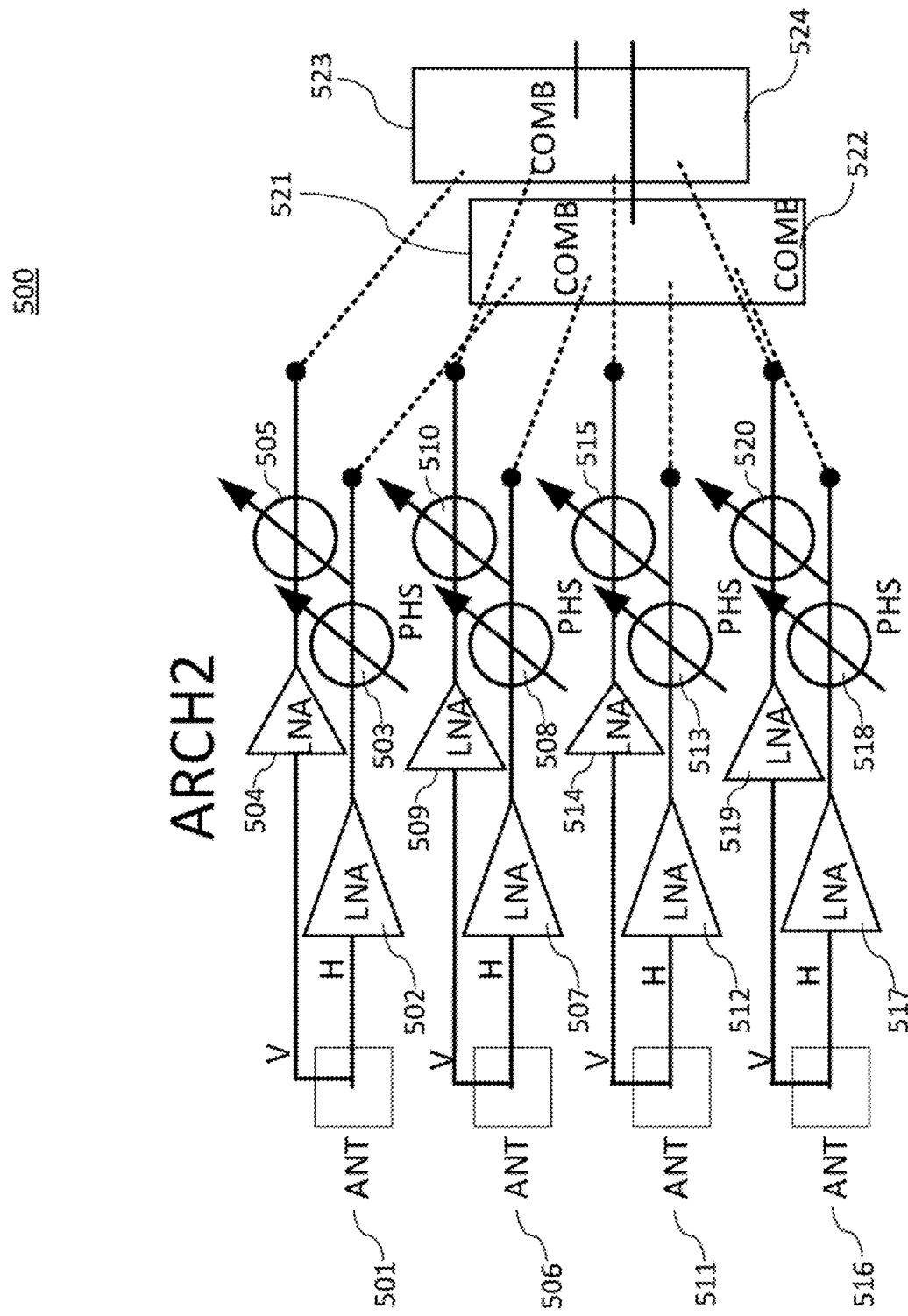
FIG. 8 shows one example of a receiver architecture, according to some embodiments.

Illustrated in more detail in FIG. 8, ARCH2 500 architecture is a simplified DL Dual polarized (H+V) four (4) patch combined steerable array. ARCH2 500 controls two (2) beams, one in each polarization. ARCH2 500 includes four antennas 501, 506, 511, 516, each coupled, respectively, to two of eight LNAs 502, 504, 507, 509, 512, 514, 517, 519. The eight LNAs 502, 504, 507, 509, 512, 514, 517, 519 are coupled, respectively, to one of eight PHSs 503, 505, 508, 510, 513, 515, 518, 520. The eight PHSs 503, 505, 508, 510, 513, 515, 518, 520 are each coupled to one of four combiners 521, 522, 523, 524, as shown in FIG. 8, such that after bi-direction phase shifting, the signal from the four antennas 501, 506, 511, 516 can be combined.

Figure 9:
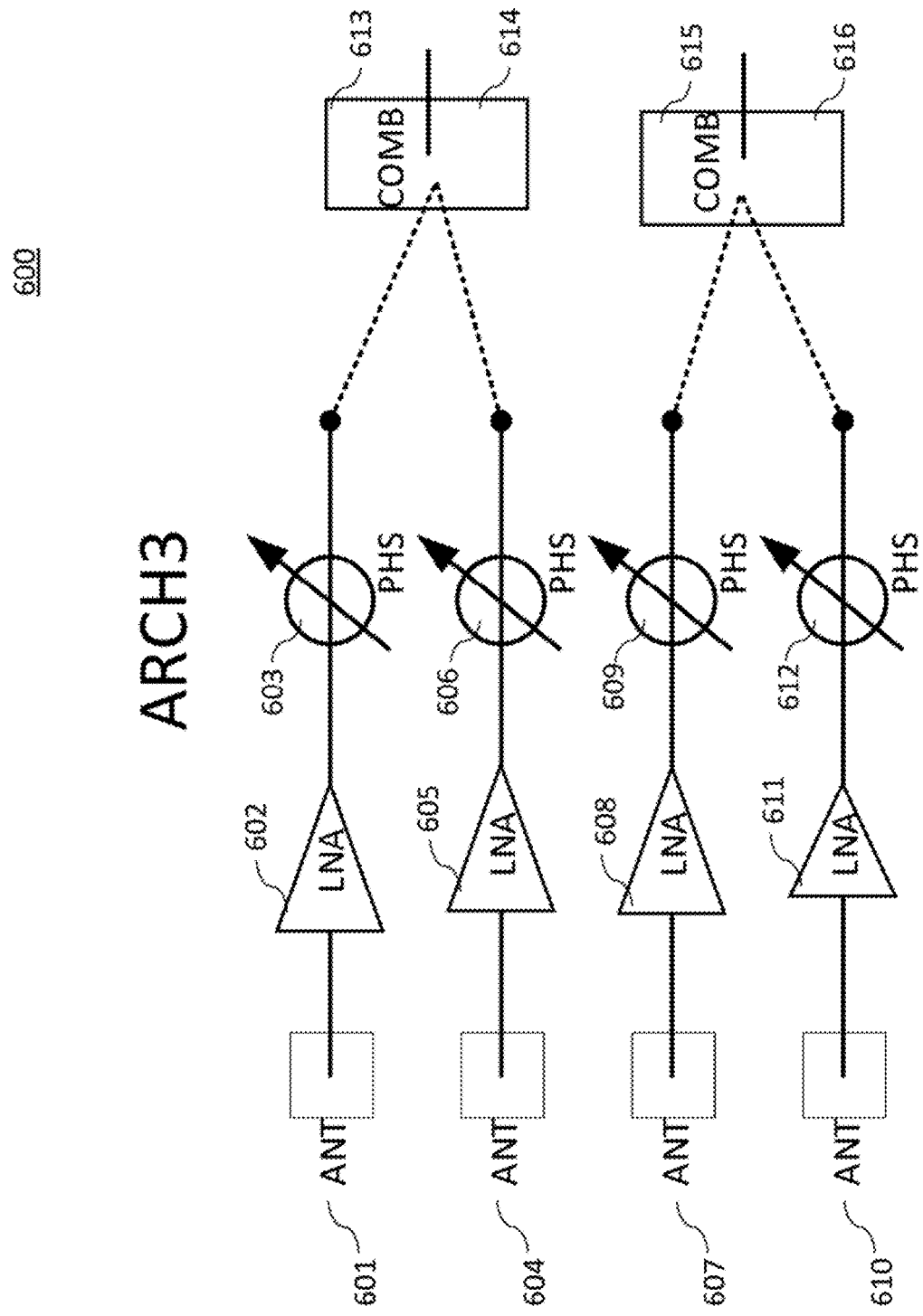
FIG. 9 shows one example of a receiver architecture, according to some embodiments.

Illustrated in more detail in FIG. 9, ARCH3 600 (also called a "split array" architecture), is a simplified DL single polarization 2×2 patch combined steerable dual array. ARCH3 600 controls two (2) beams in the same polarization, created each with two (2) patches per beam. ARCH3 600 enables a single array of a panel to have two (2) UBA per polarization of two (2) elements per UBA. ARCH3 600 includes four antennas 601, 604, 607, 610, each of which is coupled, respectively, to one of four LNAs 602, 605, 608, 611. The four LNAs 602, 605, 608, 611 are each coupled, respectively, to one of four PHSs 603, 606, 609, 612. The four PHSs 603, 606, 609, 612 are coupled to one of four combiners 613, 614, 615, 616, as shown in FIG. 9, such that after bi-direction phase shifting, the signal from the four antennas 601, 604, 607, 610 can be combined.

Figure 10:
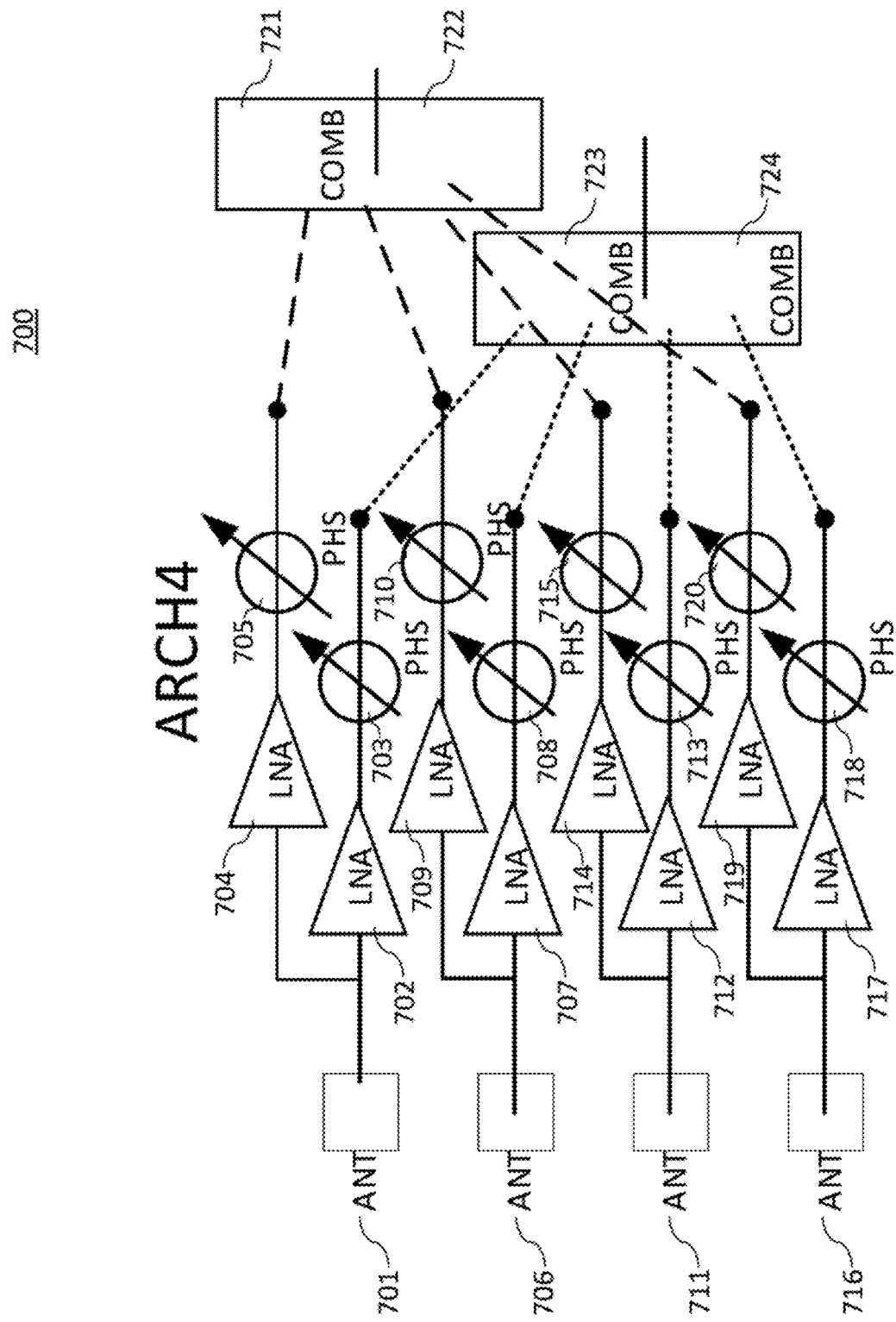
FIG. 10 shows one example of a receiver architecture, according to some embodiments.

Illustrated in more detail in FIG. 10, ARCH4 700 (also called a "full hybrid analog-digital (HAD) array" architecture) is a simplified DL single polarization four (4) patch combined steerable array. ARCH4 700 controls two (2) beams in the same polarization. In ARCH4 700, the signal is split after each antenna feeding point in such a way that the two (2) beams exploit having maximum array gain (relying on four (4) patches in a single polarization) while being steered independently. ARCH4 700 enables a single array of a panel to have two (2) UBAs per polarization of four (4) elements per UBA. ARCH4 700 includes four antennas 701, 706, 711, 716, each coupled, respectively, to two of eight LNAs 702, 704, 707, 709, 712, 714, 717, 719. Each of the eight LNAs 702, 704, 707, 709, 712, 714, 717, 719 are coupled, respectively, to one of eight PHSs 703, 705, 708, 710, 713, 715, 718, 720. Each of the eight PHSs 703, 705, 708, 710, 713, 715, 718, 720 are coupled to one of four combiners 721, 722, 723, 724, as shown in FIG. 10, such that after bi-direction phase shifting, the signal from the four antennas 701, 706, 711, 716 can be combined.

Of the non-limiting set of architectures illustrated, only ARCH2 500 shows dual polarized connection, where ARCH1 400, ARCH3 600, and ARCH4 700 are all single polarized versions. Referring to ARCH2 500, ARCH3 600, and ARCH4 700 in the context of 4-layer MIMO, it is noted that these architectures would need a double implementation that taps onto the antenna elements in the opposite polarization in addition (ARCH3 600 and ARCH4 700) or splits additionally (ARCH2 500), thereby requiring four (4) combiners, each carrying a MIMO layer.

In some embodiments presented herein, the UE is assumed to be using an architecture such as ARCH3 600 or ARCH4 700 with multiple Unique Beamformed Arrays (UBAs) for a single linear array. However, any suitable architecture or combination of architectures presented herein or known to those of skill in the art are also contemplated and covered by the present disclosure. In some embodiments, a combination of ARCH4 700 into ARCH2 500 for each polarization is used.

In some embodiments, a front end RF architecture for a UE (e.g., 203) can comprise a planar printed circuit board comprising at least receiver circuitry, a plurality of directional antennas that have radiation patterns that cover a respective plurality of partially overlapping sectors that extend outwardly from the printed circuit board, and control circuitry for controlling a discovery process for discovering availability of multiple radio links, receiving a plurality of quality measurements for signals received via the respective plurality of directional antennas from a plurality of different transmission points, and selecting directional antennas/UE panels for receiving multiple simultaneous signals from the multiple different transmission points based on, e.g., angle of arrival (AoA) of the different simultaneous signals received at the antenna array, and/or based on signal quality measurements. In some embodiments, the apparatus 100 can be configured with one or more of the front end RF architectures (e.g., 400, 500, 600, 700) in order to achieve selective spatial diversity by selection of directional antennas via multiple or a single planar circuit board.

The radiation patterns can be fixed (static) or semi-static, that is determined by a physical arrangement of antenna elements. The radiation patterns are not or need not be controlled by phased delay. According to some embodiments, the apparatus 100 can achieve selective spatial diversity by selection of fixed-pattern directional antennas via a single planar circuit board.

Figure 11:
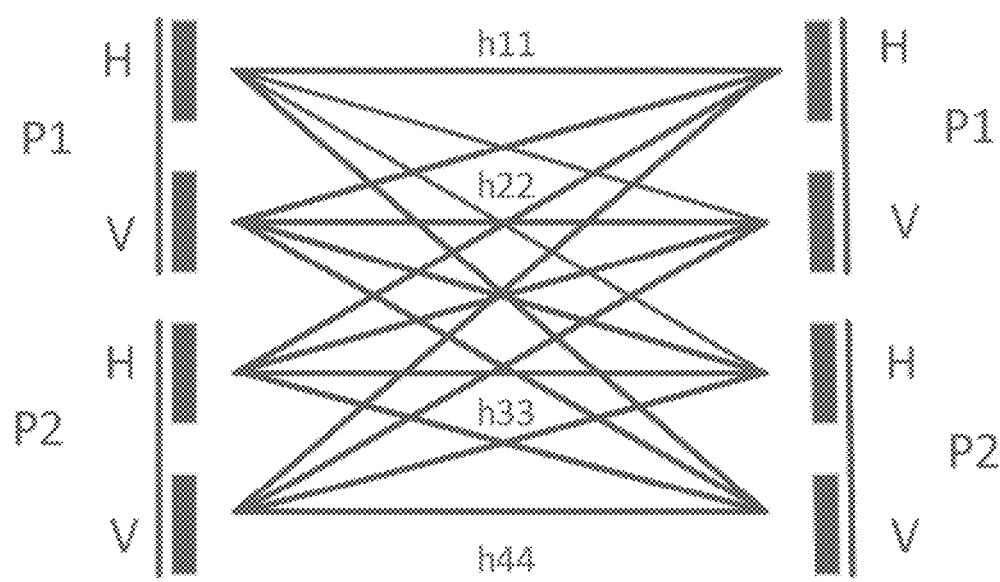
FIG. 11 illustrates an H matrix in a 2 array module, 2 polarization scenario at both Tx and Rx system, according to some embodiments.
Figure 12:
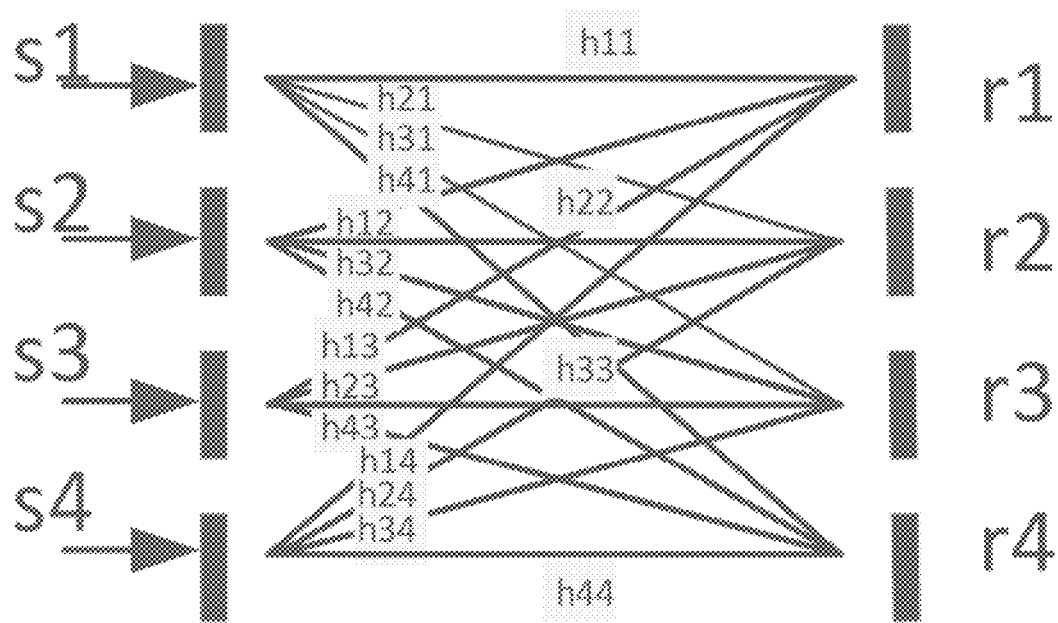
FIG. 12 illustrates an H matrix in a 2 array module, 2 polarization scenario at both Tx and Rx system, according to some embodiments.
Figure 13:
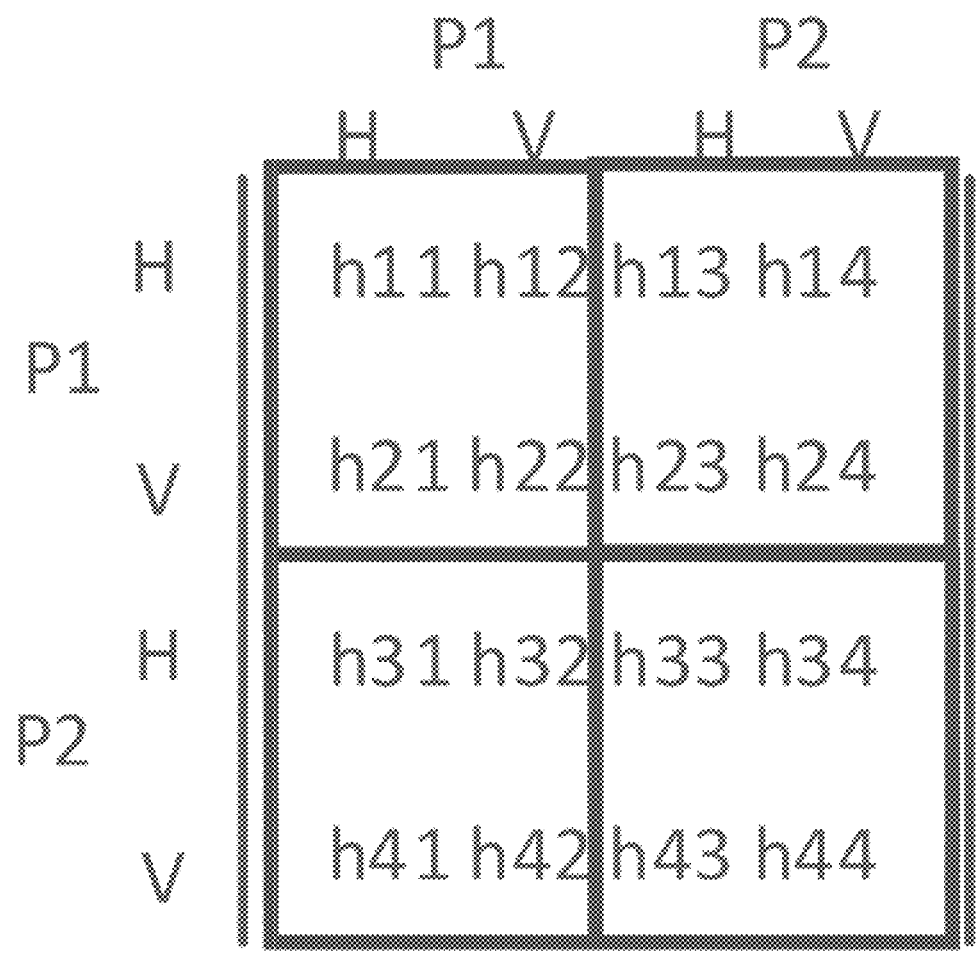
FIG. 13 illustrates an H matrix in a 2 array module, 2 polarization scenario at both Tx and Rx system, according to some embodiments.

Referring now to FIGS. 11-13, a received signal in MIMO can be represented by an H matrix, where:

$$r = Hs + w \begin{bmatrix} r_1 \\ r_2 \\ r_3 \\ r_4 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \cdot \begin{bmatrix} s_1 \\ s_2 \\ s_3 \\ s_4 \end{bmatrix} + \begin{bmatrix} w_1 \\ w_2 \\ w_3 \\ w_4 \end{bmatrix} \quad [1]$$

where, in FIGS. 11-13, P1 and P2 refer, respectively, to Panel 1 or UBA 1, and Panel 2 or UBA 2; H refers to horizontal polarization; V refers to vertical polarization; $S_n$ refers to modulated data or a reference symbol at transmission port n (e.g., P1H, P1V, P2H, P2V); $h_{mn}$ refers to an element of the H matrix between two antenna ports (n at transmitter, and m at receiver); $r_m$ refers to the received signal at receiver antenna port m; m refers to positive noise at receiver antenna port m; and $w_1 \ldots, w_4$ refer to additive white gaussian noise (AWGN) vectors.

Figure 14:
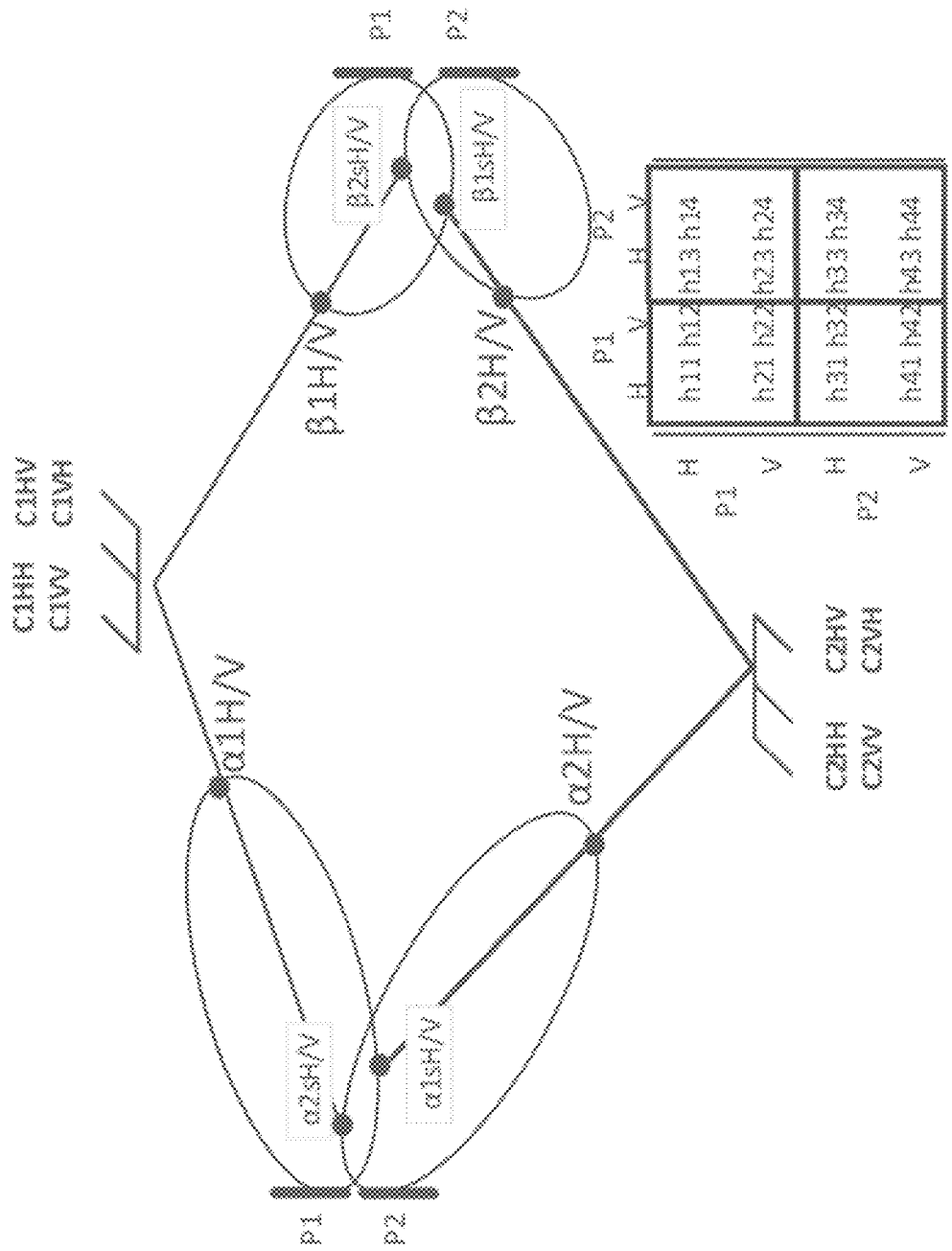
FIG. 14 is a system model representation in a 2-cluster channel model with 2 dual polarized panels at both gNb and UE, and the associated H matrix, according to some embodiments.

Referring now to FIG. 14, an example use case is presented in which the FR2 beamformed signal is received at the UE (e.g., 203) based on two (2) radio channel clusters and two (2) dual polarized antenna panels with each their respective beam at both the transmission point (e.g., gNB) and the UE. As illustrated in the system model of FIG. 14, C1HH, C1VV, C1VH, and C1HV represent cluster 1 radio channel coefficients with four (4) different polarization combinations, where a forward slash is a symbolic representation of the different selection of polarization. Thus α1H/V would be either α1H or α1V.

For a gNb beam formed by Panel1 or UBA1, therefore, α1H represents antenna gain in horizontal polarization in an AoD direction of Cluster 1 of the H channel; α1V represents antenna gain in vertical polarization in the AoD direction of Cluster 1 of the H channel; α1sH represents antenna gain in horizontal polarization in the AoD direction of Cluster 2 of the H channel; and α1sV represents antenna gain in vertical polarization in the AoD direction of Cluster 2 of the H channel.

For a gNb beam formed by Panel2 or UBA2, therefore, α2H represents antenna gain in horizontal polarization in the AoD direction of Cluster 1 of the H channel; α2V represents antenna gain in vertical polarization in the AoD direction of Cluster 1 of the H channel; α2sH represents antenna gain in horizontal polarization in the AoD direction of Cluster 2 of the H channel; and α2sV represents antenna gain in vertical polarization in the AoD direction of Cluster 2 of the H channel.

For a UE beam formed by Panel1 or UBA1, therefore, β1H represents antenna gain in horizontal polarization in the AoD direction of Cluster 1 of the H channel; β1V represents antenna gain in vertical polarization in the AoD direction of Cluster 1 of the H channel; β1sH represents antenna gain in horizontal polarization in the AoD direction of Cluster 2 of the H channel; and β1sV represents antenna gain in vertical polarization in the AoD direction of Cluster 2 of the H channel.

For a UE beam formed by Panel2 or UBA2, therefore, P2H represents antenna gain in horizontal polarization in the AoD direction of Cluster 1 of the H channel; β2V represents antenna gain in vertical polarization in the AoD direction of Cluster 1 of the H channel; β2sH represents antenna gain in horizontal polarization in the AoD direction of Cluster 2 of the H channel; and β2sV represents antenna gain in vertical polarization in the AoD direction of Cluster 2 of the H channel.

Figure 15:
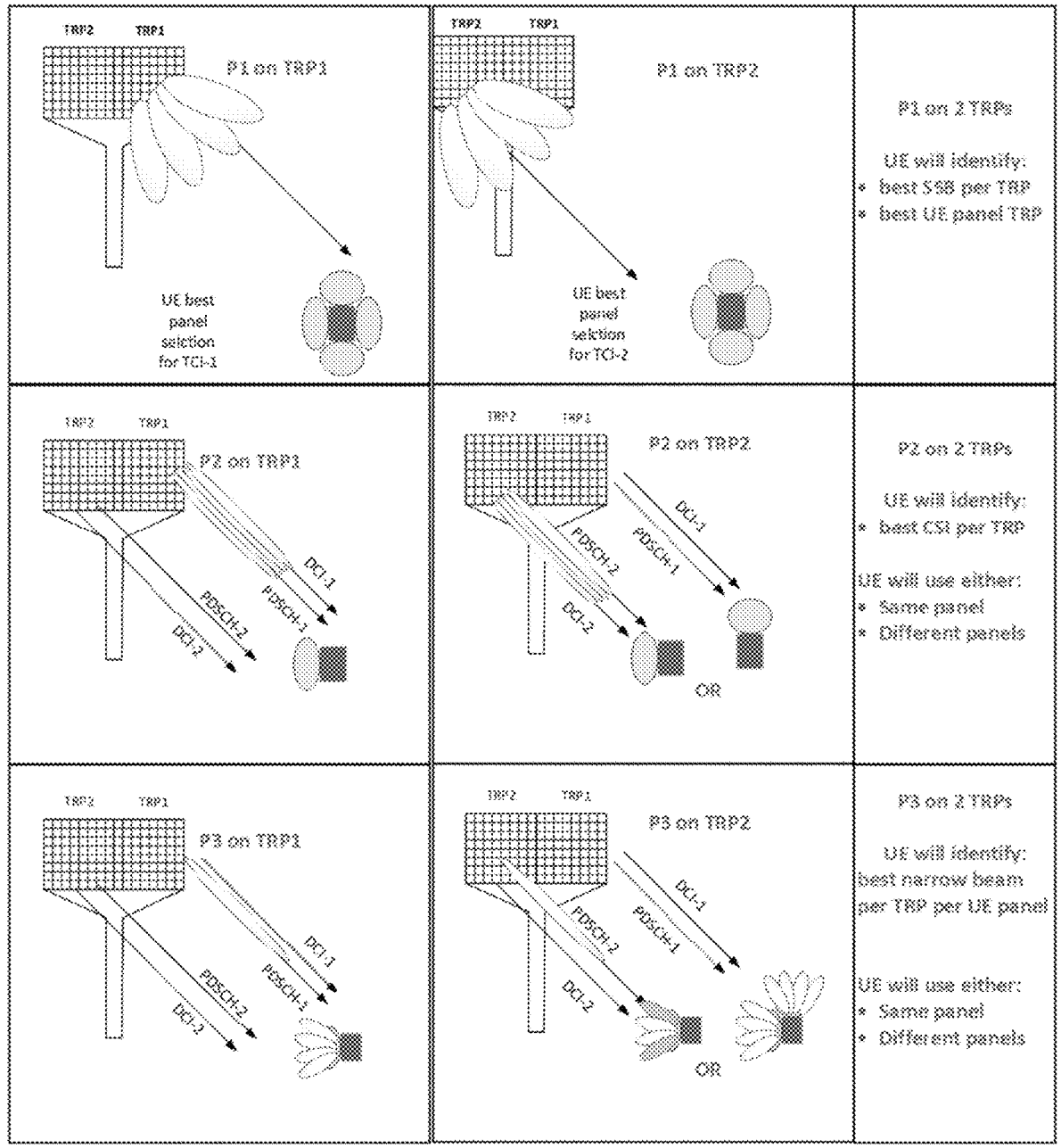
FIG. 15 illustrates a 3-phased approach to beam alignment, P1-P2-P3, for FR2 in Multi-TRP, according to some embodiments.

Referring now to FIG. 15, beam management for four-layer downlink examples is illustrated. Illustrated are three DL L1/L2 beam management procedures, also known as P1, P2, P3. These procedures inform the UE regarding enabling certain TRP measurements, for beam selection and refinement.

According to P1 on two (2) TRPs (illustrated in the first row of FIG. 15), the base station performs a periodic SSB based beam sweep over entire cell and triggers measurement by the UE of TRP beams for selection of TRP Tx beams and selection of UE Rx beam. Part of the SSB burst is used by TRP1 and another part of the SSB burst is used by TRP2. The UE measures the power of the received signals from all base station Tx beams using a wide Rx beam and reports to the base station which SSB beam has the highest power (per TRP in multi-TRP).

According to P2 on 2 TRPs (illustrated in the second row of FIG. 15), the base station performs a more angular focused narrow beam sweep (than in P1), using CSI-RS (periodic, semi persistent, or aperiodic). TRP1 and TRP2 can both send in a time multiplexed and a time overlapped manner CSI-RS based narrow beam sweep (around the angular area of the best SSBs). The UE measures the power of the received CSI-RS from each TRP and reports the ones with highest power per TRP. This is done in order to establish the best narrow beam for each TRP.

According to UE Beam Refinement/P3 on 2 TRPs (illustrated in the third row of FIG. 15), the base station transmits CSI-RS with repetition ON using the best narrow beam from P2 on each TRP. This will enable the UE to perform a narrow Rx beam sweep on each TRP signal to find its best Rx beam by measuring the power of the received CSI-RS on a set of selected RX UE beams. The UE would then typically select the beam with highest power for each TRP.

In order for the UE to distinguish which beams come from which TRP a parameter is set: coresetpoolIndex. With this parameter the UE can assume that all the data scheduled by PDCCH in CORESETs with the same CORESETPoolIndex comes from the same TRP.

In some embodiments, the index of the CORESET pool for this CORESET is specified.

However, UE-performed beam refinement (i.e., discovering and shaping its best narrow beams) is not currently optimized for FR2 DL multi-layer reception with multiple (e.g., 2) transmission points and multiple (e.g., 2) TCI/DCIs received on a same UE panel but different UBAs of the same panel.

Figure 16:
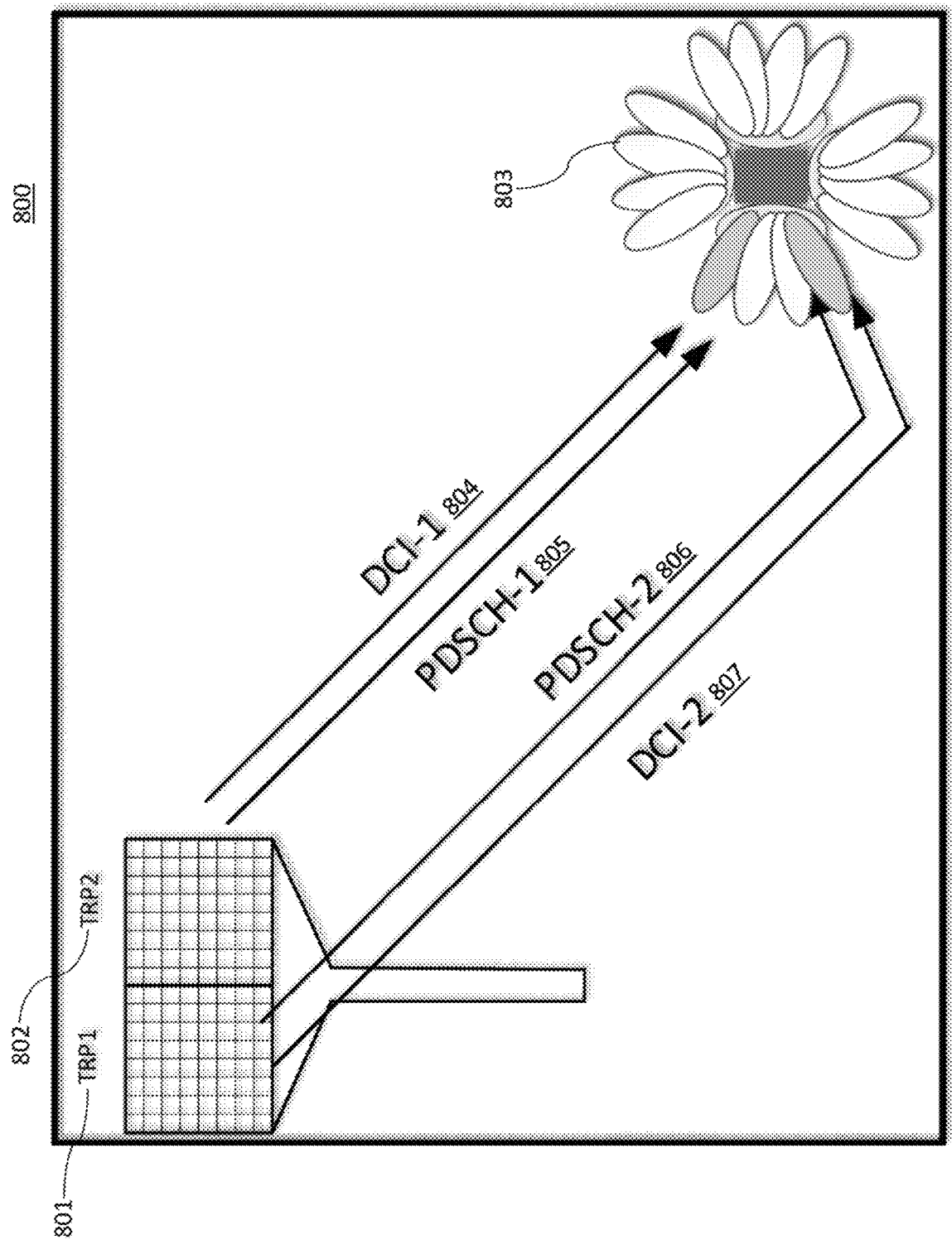
FIG. 16 illustrates an approach for M-TRP M-DCI 4 layer transmission in FR2 to a Multipanel UE, according to some embodiments.

Referring now to FIG. 16, a multiple transmission point (M-TRP), multiple DCI (M-DCI) 4-layer transmission scheme is in FR2 to a UE comprising multiple panels (e.g., multiple mmWave antenna array modules) is illustrated. In instances, for example, where the enhanced FR2 UEs receives simultaneously two different downlink signals, e.g., TypeD RS s on a single component carrier simultaneously with up to 4 layer DL MIMO, e.g., FR2 dual-TRP dual-TCI with 1 CW per TCI/TRP, the UE (equipped with multiple panels) requires additional information and standardized approaches for performing beam refinement and determining when to simultaneously receive two different downlink signals, e.g., TypeD RS s on a single component carrier at a single (same) panel (i.e., the same MmWave antenna array module).

Referring back to Eq. 1, above, additional nomenclature is defined to aid in beam refinement. For example, the desired signal per UBA is defined as:

$$\text{Desired\_signal\_}UBA1=h_{11}+h_{22}$$

$$\text{Desired\_signal\_}UBA2=h_{33}+h_{44}$$

The inter layer group interference (ILGI) per UBA is defined as:

$$\text{Inter\_layergroup\_Interference\_}UBA1=h_{13}+h_{14}+h_{23}+h_{24}$$

$$\text{Inter\_layergroup\_Interference\_}UBA2=h_{31}+h_{32}+h_{41}+h_{42}$$

The intra layer group interference per UBA (cross polarization mismatch) is defined as:

$$\text{Intra\_layergroup\_Interference\_}UBA1=h_{12}+h_{21}$$

$$\text{Intra\_layergroup\_Interference\_}UBA2=h_{34}+h_{43}$$

Figure 17:
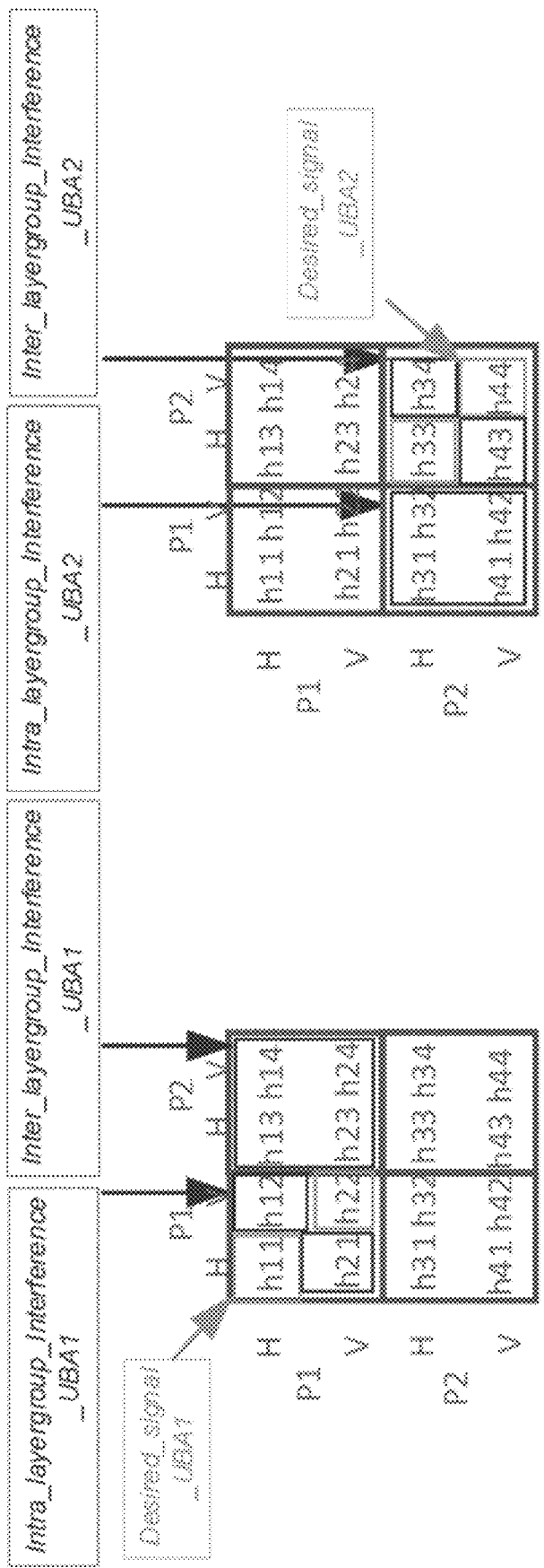
FIG. 17 is a visual representation of different types of signals in the H matrix, according to some embodiments.

Referring now to FIG. 17, this nomenclature is represented on the H matrix. This nomenclature is also represented in the H matrix in FIG. 14. This shows that in order to minimize the gain in the non-desired angles, elements $h_{13}$, $h_{14}$, $h_{23}$, $h_{24}$, $h_{31}$, $h_{41}$, $h_{32}$, and $h_{42}$ (i.e., the Inter_layergroup_Inference elements) are evaluated.

Figure 18:
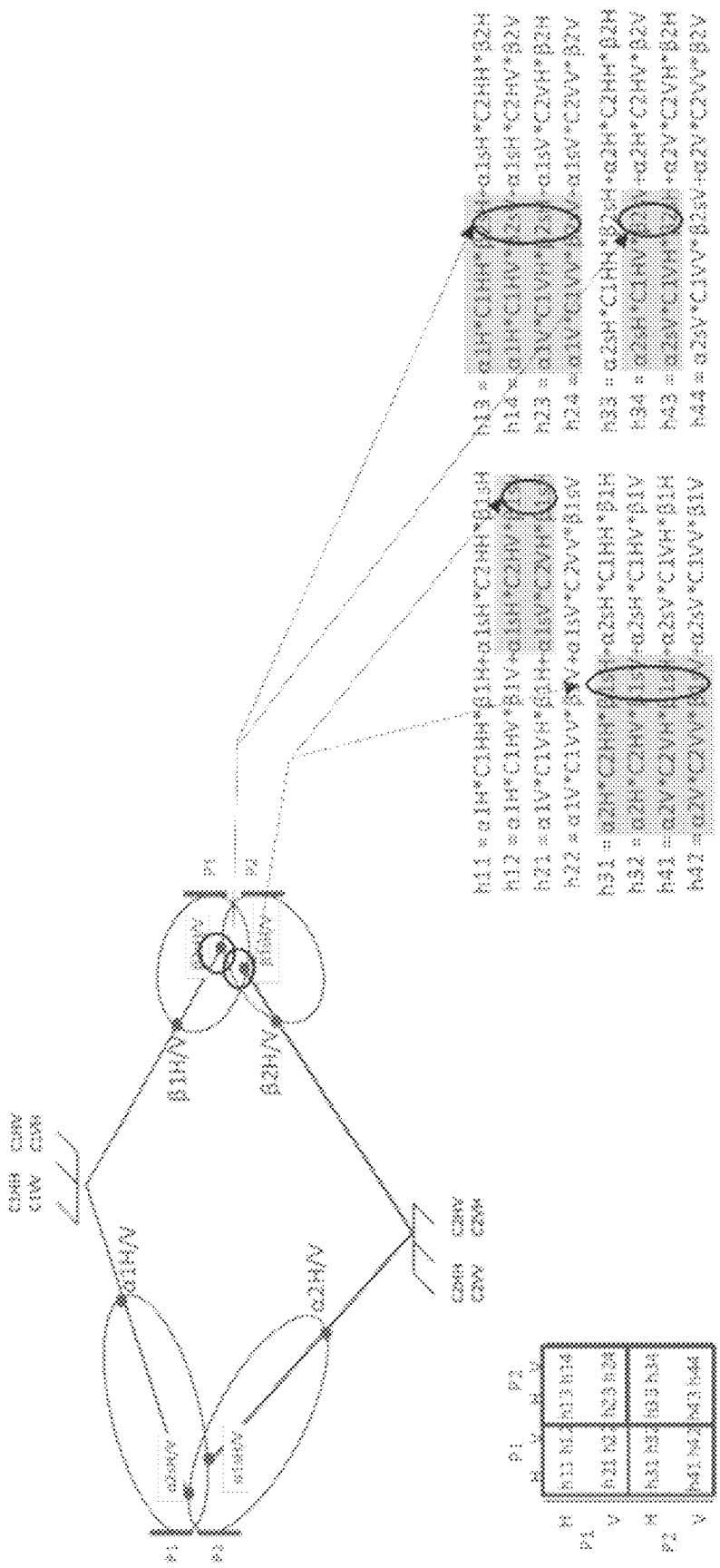
FIG. 18 illustrates an approach for identifying the strongest inter- and intra-layer-group interference components mapped on the detailed H matrix, according to some embodiments.

According to an embodiment, the strongest components of inter and intra layer group interference are shown in FIG. 18. For the inter layer group interference base station, sidelobe contribution can be up to 20 dB lower than main lobe. This means that interlayer group interference is dominated by the UE gain coefficients, according to the illustrated embodiment.

Figure 20:
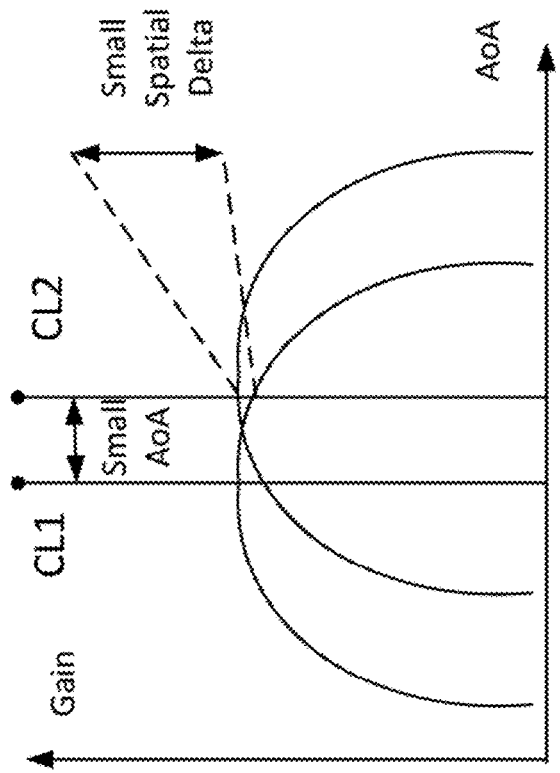
FIG. 20 illustrates an example use case for reception of signals with a narrow angular difference, according to some embodiments.
Figure 19:
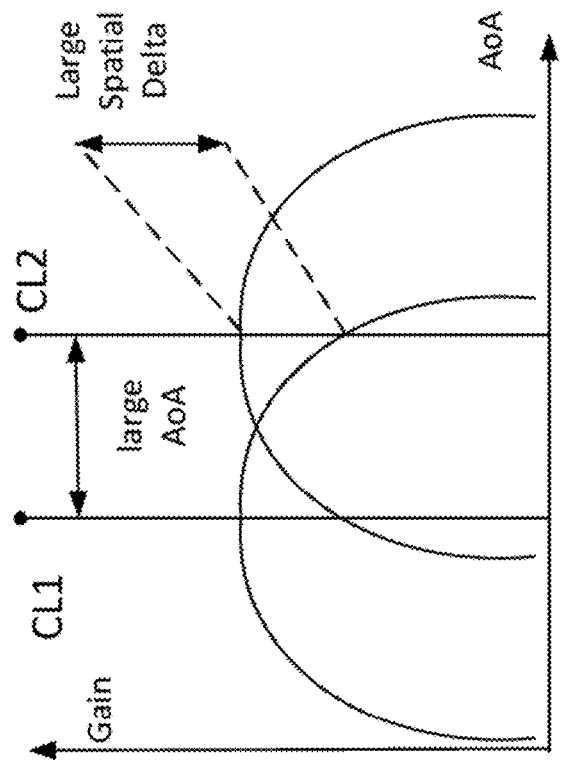
FIG. 19 illustrates an example use case for reception of signals with a wide angular difference, according to some embodiments.

The UE receiver H matrix model illustrated in FIG. 18 can be simplified to reflect two non-limiting cases: a "wide case" and a "narrow case", which are illustrated, respectively, in FIGS. 19 and 20.

In FIG. 19, the "wide case", the AoA difference between the two received signals is relatively large, as compared to the "narrow case". In the wide case, the signals from both TRPs may both have an incoming AoA outside the respective half power beamwidth of the 2 narrow Rx beams at the UE selected panel.

In FIG. 20, the "narrow case", the AoA difference between the two received signals is relatively small, as compared to the "wide case". In the narrow case, the signals from both TRPs may both have an incoming AoA within a respective half power beamwidth of the 2 narrow Rx beams at the UE selected panel.

When considering the two cases presented in FIGS. 19 and 20, the "narrow CASE" with "small" angular difference in angle between the two incoming signals, will lead to a high inter UBA signal interference"pollution".

In some embodiments, radio channel conditions may be experienced with narrow angular differences between two (2) signals sent from, respectively, two (2) different TRPs. The UE may not know the best beam steering procedure per UBA to maximize the MCS per DCI for a single UE panel reception.

Figure 21:
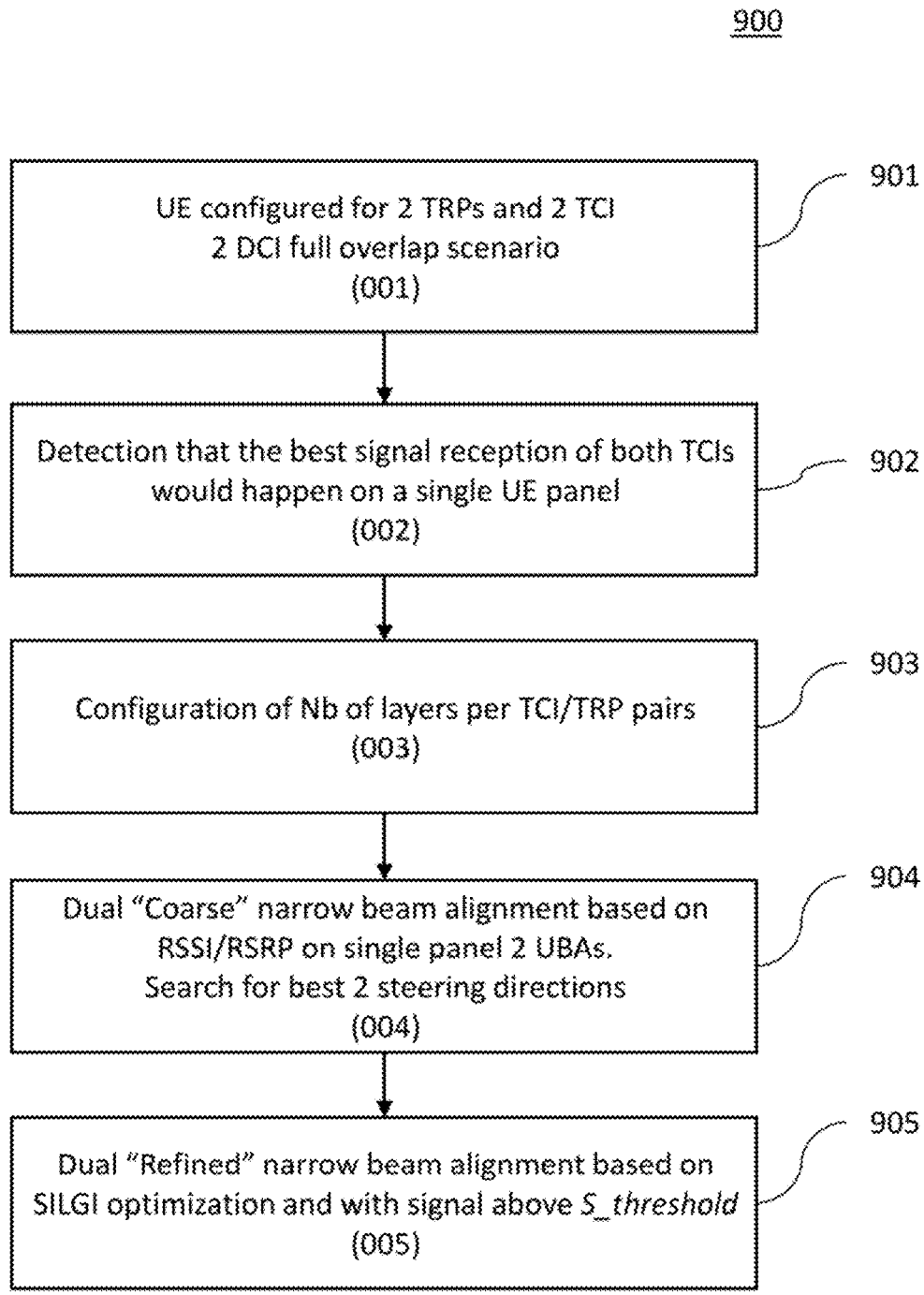
FIG. 21 is a process flow diagram of an example method described herein.

Referring now to FIG. 21, a process flow 900 is illustrated for carrying out simultaneous dual-beam operation on a same panel at a UE for 4-Layer DL MIMO. In some embodiments, the UE (e.g., 203) is not steering its Rx spatial filter with the aim of maximizing the RSRP values per UE beam, but is steering its Rx spatial filters in order to maximize the per UBA Signal to inter-layer-group-interference resulting in maximizing the DL BLER performance per layer-group as well as the reported CQI per layer-group.

The process flow 900 comprises steps including: the UE is configured for a two (2) TRPs and two (2) TCI/two (2) DCI full overlap scenario, at 901. The process flow 900 further includes detection by the UE that the best signal reception of both TCIs would happen on a single (same) UE panel, at 901. The process flow 900 further includes configuration of Nb of layers per TCI/TRP pairs, at 903. The process flow 900 further includes dual 'coarse' narrow beam alignment by the UE and based at least on RSSI/RSRP on single panel 2 UBAs, and searching for the best two (2) steering directions, at 904. The process flow 900 further includes dual 'refined' narrow beam alignment based on SILGI optimization/improvement and with signal above S_threshold, a predetermined signal threshold, at 905.

Figure 22:
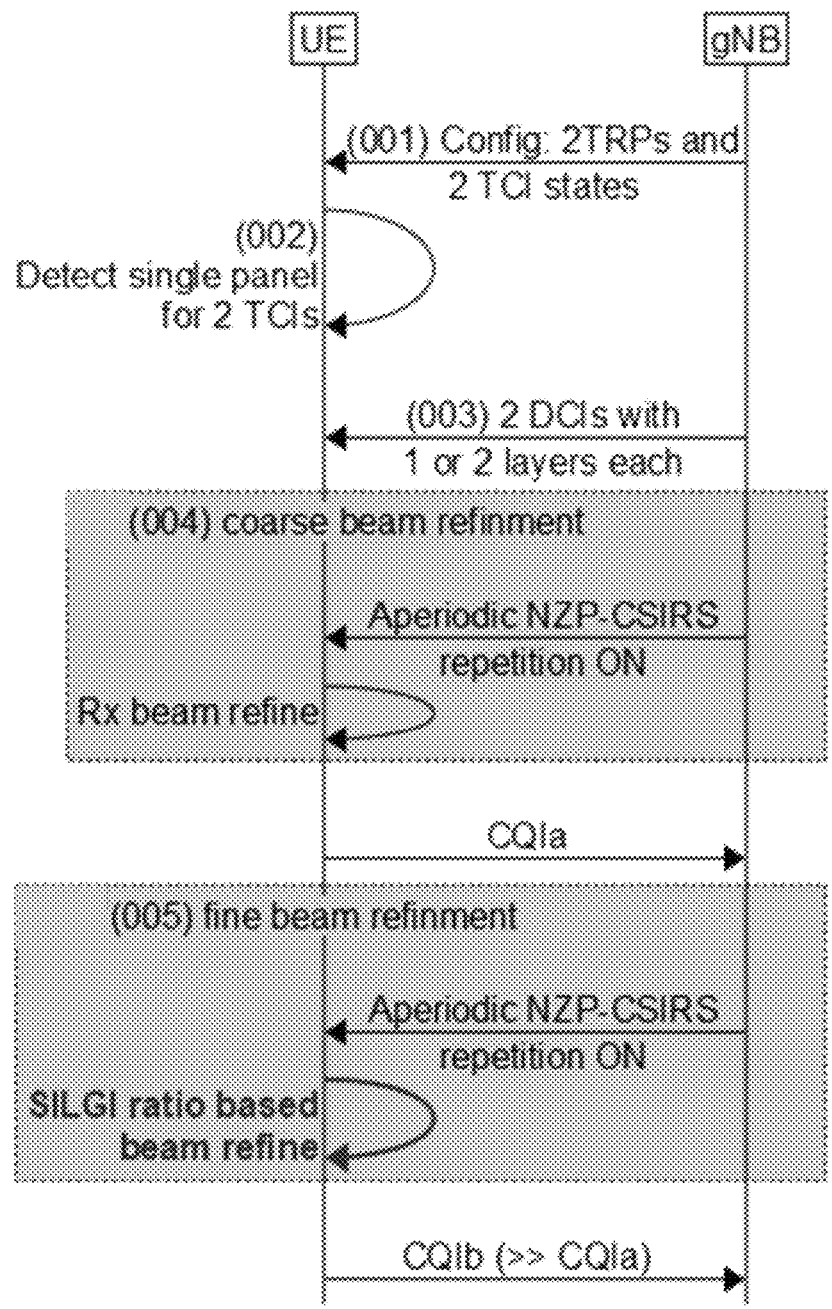
FIG. 22 is a signaling flow diagram of a signaling approach for fine beam refinement based on SILGI, according to some embodiments.

Referring now to FIG. 22, a signal flow 1000 is illustrated for carrying out beam refinement based, at least in part, on SILGI. In the signal flow 1000, signaling is carried out between a UE (e.g., 203) and a gNB or the like. According to the embodiment illustrated in FIG. 22, the signal flow 1000 can include several steps, referred to herein as steps (001) to (005).

In step (001), the UE is configured by the network for reception of simultaneous transmission from two (2) TRPs with two (2) active TCI states that are not Type D (not sharing same RX filters at UE),—hence 2 DCIs with full overlap of PDSCH.

In step (002), the UE detects that the two (2) TCIs need to be received on a single panel and not on two different panels, e.g., corresponding to case B illustrated in FIG. 4.

In step (003), the UE is then configured to receive the signal from the two (2) TRPs containing one (1) or two (2) layers per TRP with one (1) DCI per TRP with an associated CSI per TRP.

In step (004), the UE performs a 'coarse narrow beam' refinement for EACH TCI state to find AoAs that maximizes power/RSRP/RSSI on each UBA. This could be done sequentially or simultaneously via a narrow beam sweep during one or more of:
a. aperiodic transmission of NZP-CSI-RS with repetition 'on' for each active TCI state,
b. synchronization signal (SS) bursts, and/or
c. cyclic prefix (CP) based on beam sweeping during PDSCH, in order to find the best two (2) dual polarized beams at the receiver (UE).

In step (005), the UE then performs a 'refined narrow beam' refinement for EACH TCI state to find AoAs which maximizes desired Signal to Inter-Layer-Group-Interference (SILGI) ratio, under constraint of RSRP of desired signal not falling below a signal threshold S_threshold (e.g., 3 dB below RSRP from step (004)).

In step (005), the UE may evaluate the H matrix, such as that depicted in FIG. 18, for each transmitted 4-port CSI-RS OFDM symbols with repetition set to 'ON'. In some embodiments, up to eight (8) repetitions can be transmitted sequentially and for each of them, and the UE selects a new 'refined narrow beam' with an angular increment steered away from the AoA of the other TCI received on the other UBA of the same panel.

Figure 23:
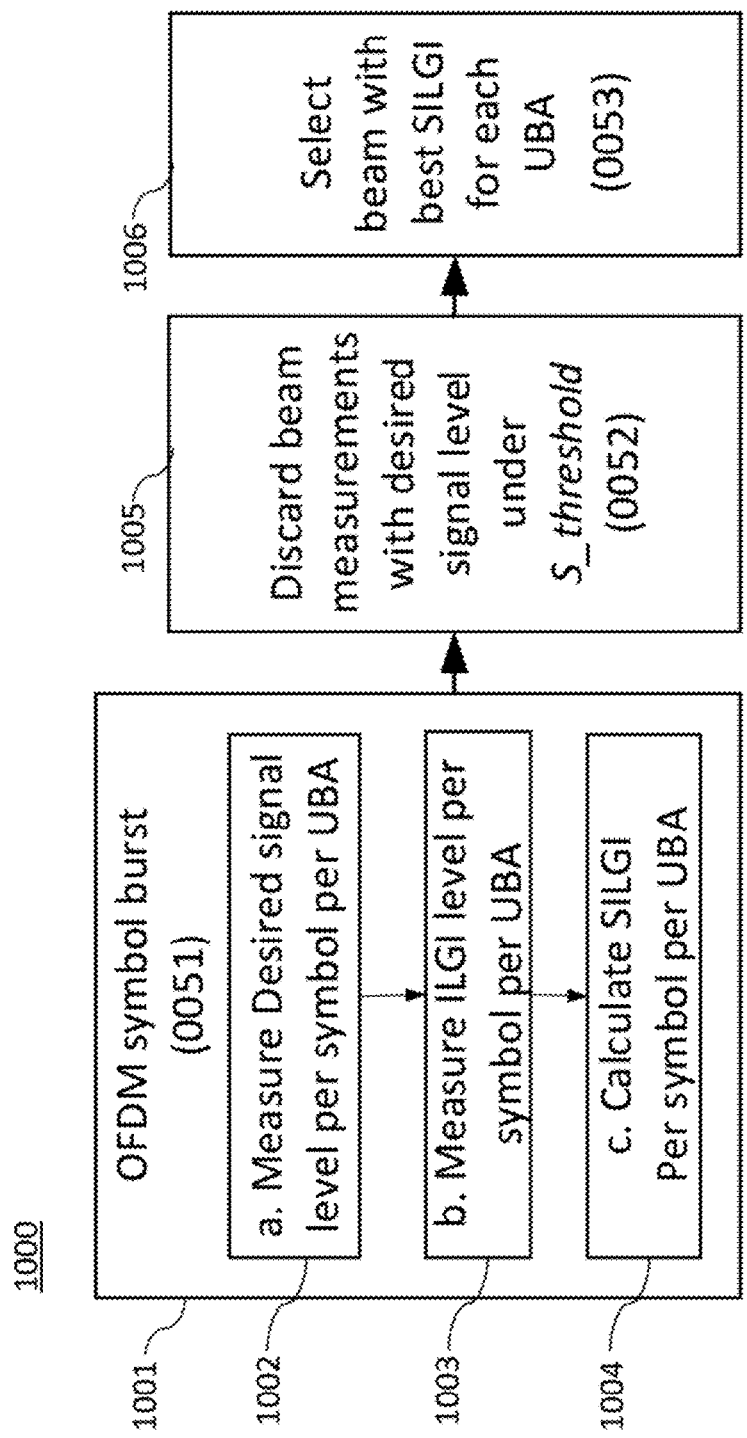
FIG. 23 illustrates an approach for performing refined narrow beam refinement for each TCI state to find AoAs which maximize desired Signal to Inter-Layer-Group-Interference (SILGI) ratio, under constraint of RSRP of desired signal not falling below a signal threshold, according to some embodiments.

Referring now to FIG. 23, a more detailed illustration of step (005) from signaling flow 1000 of FIG. 22 is illustrated.

During sub-step (0051), for each OFDM symbol of the burst, at 1001, the UE:
a. Measures the desired signal for UBA1 and UBA2 of same panel, at 1002,
b. Measures the ILGI for UBA1 and UBA2 of same panel, at 1003, and
c. Calculates SILGI for UBA1 and UBA2 of same panel, at 1004.

At the end of the measurement sequence/full OFDM symbol burst, the UE continues on to substep (0052), in which the UE discards the measurements from the beams that lead to a desired signal level below S_threshold, at 1005.

Next, at substep (0053), from the measurements that have a signal level above S_threshold, the UE beams with the best SILGIs are selected, at 1006.

As illustrated in FIG. 23, which reflects an example of the refined beam steering approach taken in step (005) of the signal flow 1000, it can be seen that the beams may be steered away from each other while keeping an acceptable gain value in the direction of interest in order to reduce the gain in the non-desired direction to minimize cross-layer-group interference.

Figure 24:
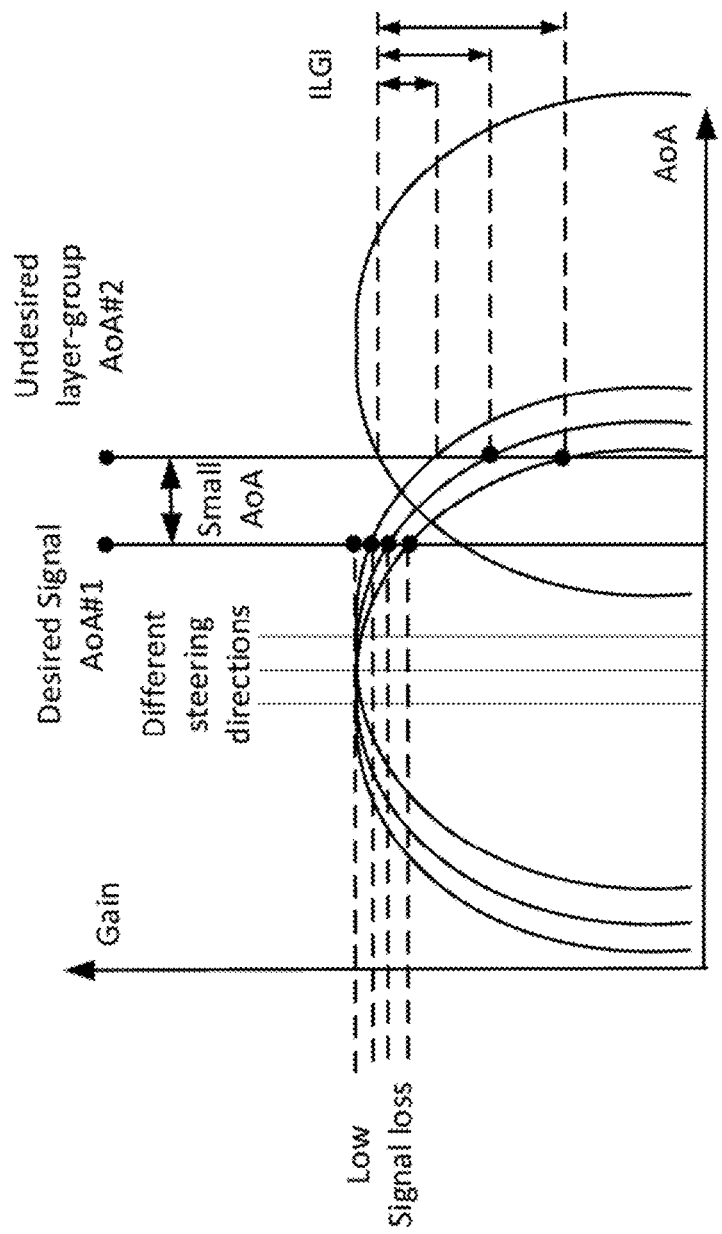
FIG. 24 illustrates an approach for large ILGI reduction with small desired signal loss, according to some embodiments.

Referring now to FIG. 24, a refined beam steering approach is illustrated in which there is a large ILGI reduction with small desired signal loss, but large ILGI reduction.

Accordingly, in some embodiments, in order to increase, maximize, optimize, improve, help, aid, or otherwise make the SILGI (signal to inter_layergroup_interference) per UBA more desirable, the two (2) beams on the two (2) UBAs of the active UE panel will be steered, in some embodiments, with a different optimization key performance indicator (KPI) than has been used in the past, resulting in large differences in CQI per layer group UE reporting (e.g., for each TRP).

Provided hereinbelow is a numerical example 1100 with phase shifter control for beam steering. In the described example, the UE steers the beams not according to best RSRP but by focusing on signal to inter-layer-group interference (SILGI) optimization, as illustrated for example in FIG. 25 with a first curve 1101 representing a first beam that is steered towards a first angle of arrival (AoA1) (e.g., boresight 0 degrees) and a second curve 1102 representing a second beam steered towards a second angle of arrival (AoA2) (+10 degrees) with an antenna array (e.g., a 1×4 antenna array, or the like) for each AoA (e.g., 22.5 degrees half-power beamwidth). The steering/shifting of the second beam is shown the translation of the second curve 1102 to a third curve 1103, to a fourth curve 1104, to a fifth curve 1105.

Figure 25:
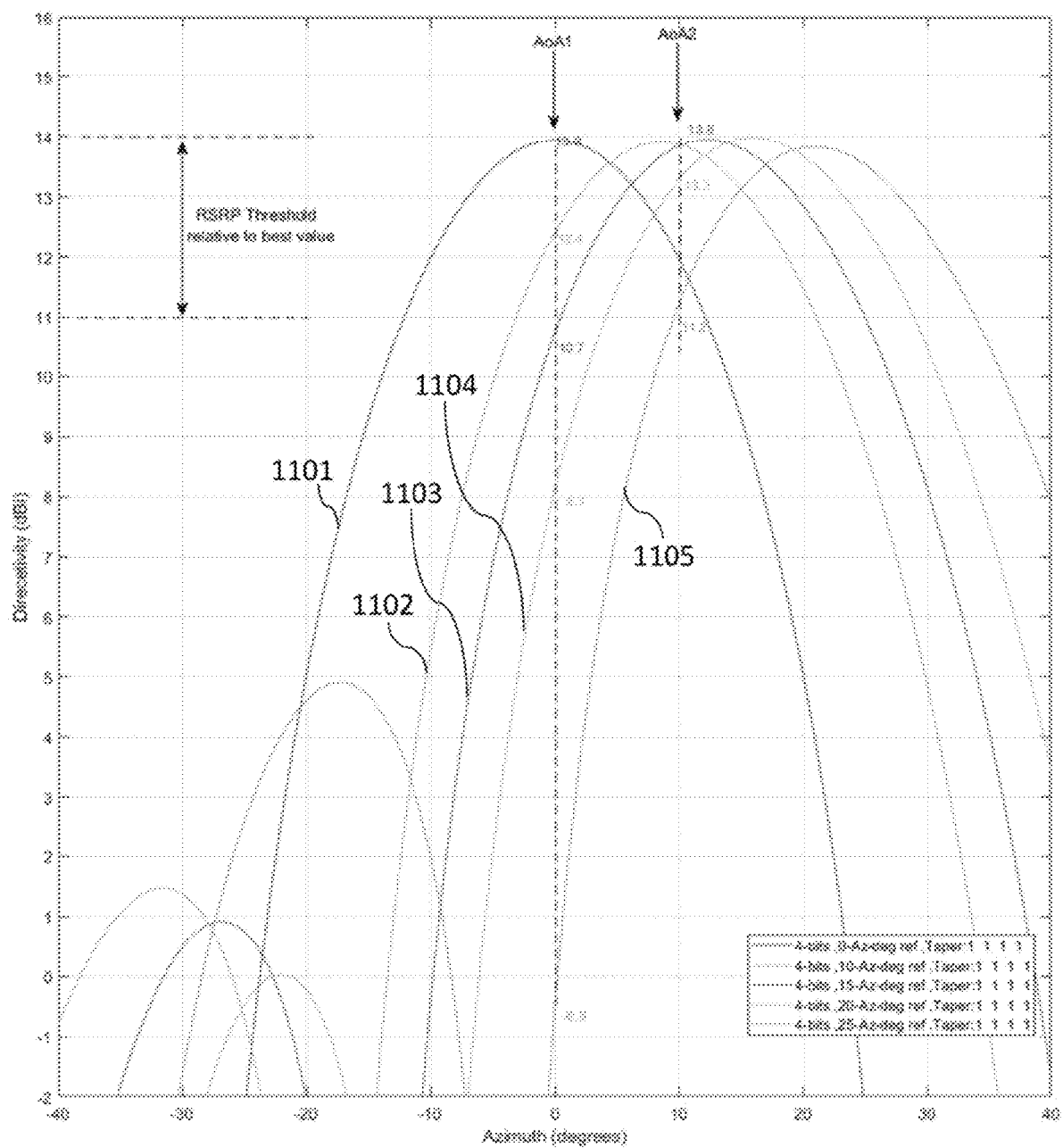
FIG. 25 is a graph for aiding alignment towards AoA2 considering the RSRP value from AoA2 as well as interlayer interference level from AoA1 with phase control only on a 4-bit phase shifter, according to some embodiments.

According to some embodiments, the baseline beams are aligned for the maximum gain for each AoA, e.g., as illustrated by the first curve 1101 and the second curve 1102 in FIG. 25. In this example 1100, the maximum gain values are 13.9 dB and 13.8 dB, respectively, and the gain values of the opposite AoA are 12.4 dB and 12 dB, respectively. As shown in FIG. 25, the second beam towards AoA2 can be steered further (e.g., +15/+20/+25 degrees) with little degradation on peak RSRP though significant improvement on SILGI received from AoA1, captured also with the RSRP Threshold at the left in FIG. 25.

As shown in FIG. 25, for the illustrated example 1100 there is a maximum loss of 2.6 dB (13.8 dB–11.2 dB) in RSRP from AoA2 in order to reduce by 12.9 dB (12.4 dB–(–0.5 dB)) the antenna gain towards AoA1, and thereby increase/improve/maximize SILGI from AoA1. In the illustrated example 1100, the maximum antenna gain loss in the desired AoA versus the antenna gain enhancement towards the non-desired AoA can be controlled with an RSRP threshold relative to the best aligned beam. In this example, it is assumed to be 3 dB relative to RSRP, this threshold (i.e., S_threshold) may be implementation specific.

The example 1100 illustrated in FIG. 25 is for a UE with 4-bits phase shifters on the antenna elements and beam pattern steering steps of 5 degrees in Azimuth, however additional or alternative configurations are contemplated.

Figure 26:
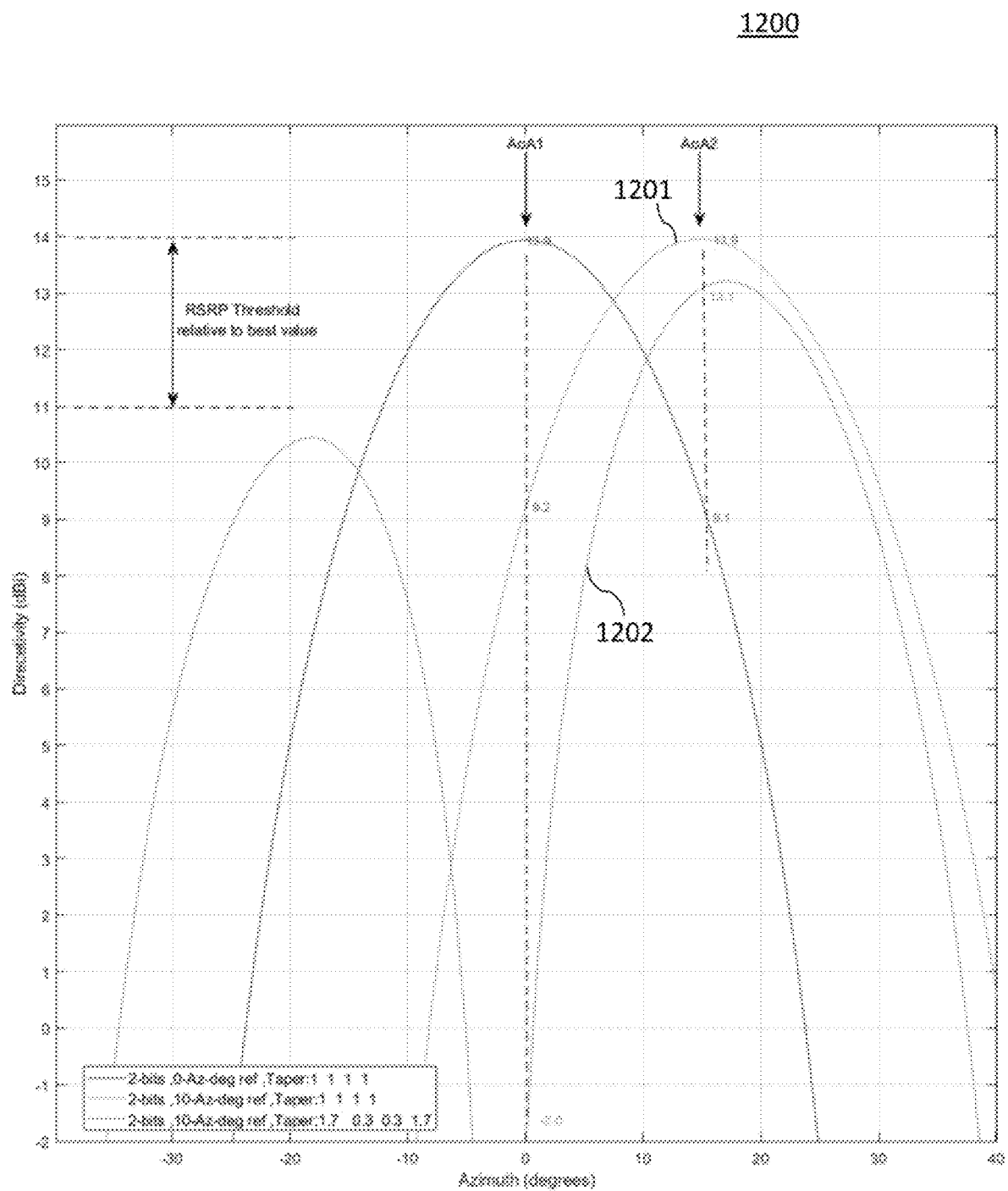
FIG. 26 is a graph for aiding alignment towards AoA2 considering the RSRP value from AoA2 as well as inter-layer interference level from AoA1 with phase and amplitude control on a 2-bit phase shifter, according to some embodiments.

Provided hereinbelow is an alternative numerical example 1200 in which the UE is configured for phase shifting and amplitude control for beam steering. In this example 1200, an alternative front end architecture is used which includes 2-bit phase shifters, with amplitude control in addition to phase control (higher complexity). The resulting steering potential with amplitude control is shown in FIG. 26, as the progression between a first curve 1201 to a second curve 1202, where the gain towards AoA2 is reduced by only 0.8 dB (13.9–13.1 dB) in order to decrease the gain in AoA1 by 11.2 dB (9.2–(–2.0 dB)). In the example 1200 illustrated in FIG. 26, the UE is configured for alignment towards AoA2 considering RSRP value from AOA2 as well as inter-layer interference level from AoA1 with phase and amplitude control on a 2-bit phase shifter.

In some embodiments, the described approaches minimize gain in an undesired inter-layer-group direction (AoA

2) while maintaining a high gain in the desired signal direction (AoA #1). This can be regarded and defined as 'maximizing' the ratio between the two gain values. This can be reflected using the below metric per UBA for SILGI:

$$SILGI_{UBA1} = \frac{\text{Desired\_signal\_UBA1}}{\text{Inter\_layergroup\_Interference\_UBA1}}$$

With the SILGI metric, the UE can adjust its Rx beam alignment in order to maximize the signal to inter-layer-group Interference for a given codeword. This differs significantly from best power steering or classical SINR maximization since this metric focuses on a specific Inter-layer-group Interference. For example, best power steering can lead to very high inter layer-group interference in case of narrow AoA between the two (2) TCIs at the UE, thus severely reducing the allocated Modulation and Coding Scheme (MCS) for each PDSCH sent on each TRP. SINR maximization will mainly optimize Signal to co-channel interference coming from other cells, and thus will have no impact on SILGI.

Figure 27:
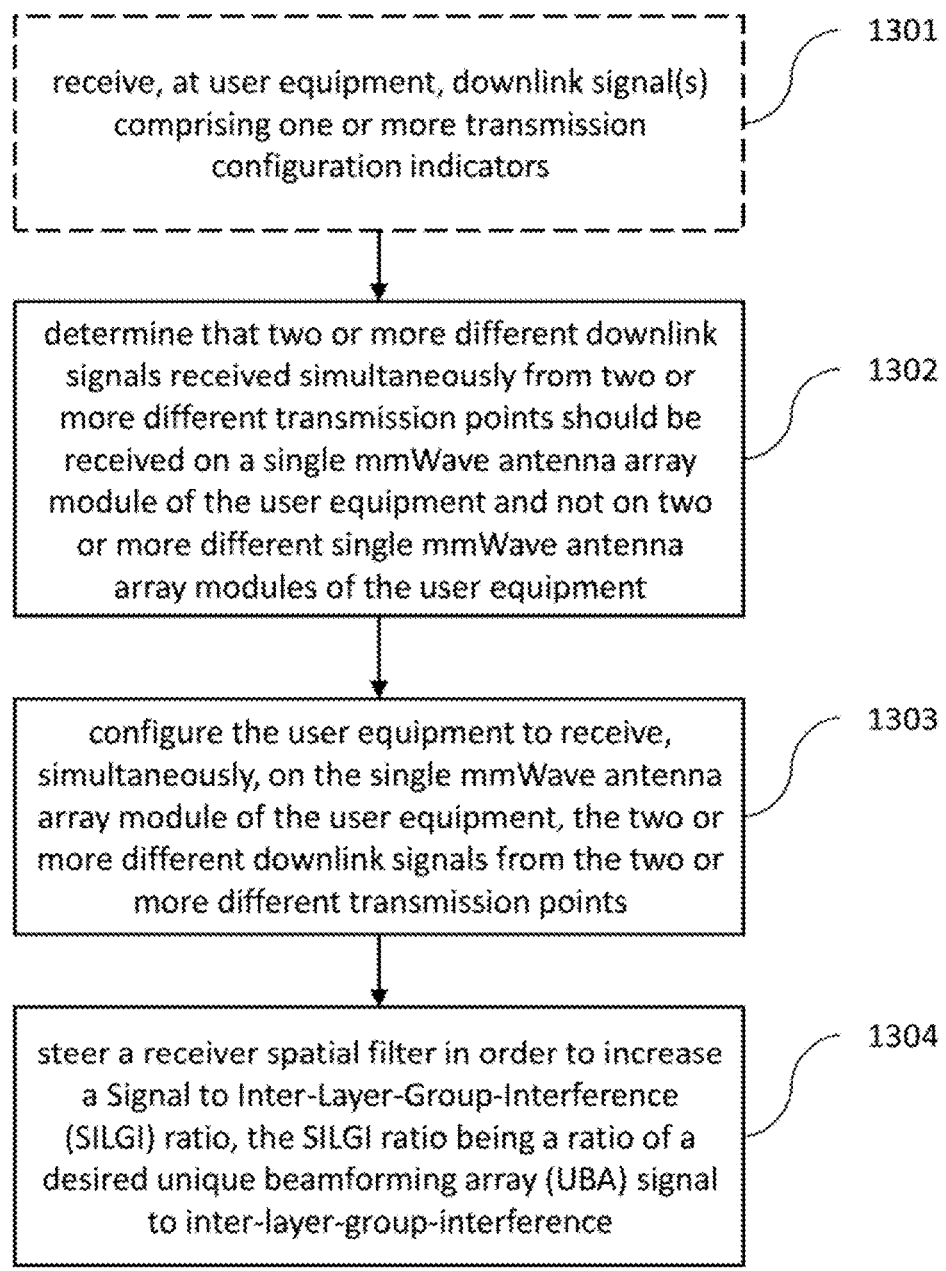
FIG. 27 is a process flow diagram of an example method described herein.

Referring now to FIG. 27, a method 1300 is illustrated that can be carried out by means, such as an apparatus comprising a processor and a memory storing computer program codes/instructions. The method 1300 can alternatively or additionally be carried out by means such as the apparatus 100 or the UE 203 described above. In some embodiments, the method 1300 can comprise, optionally, receiving, at user equipment, downlink signal(s) comprising one or more transmission configuration indicators, at 1301. In some embodiments, the method 1300 can comprise determining that two or more different downlink signals received simultaneously from two or more different transmission points should be received on a single mmWave antenna array module of the user equipment and not on two or more different single mmWave antenna array modules of the user equipment, at 1302. In some embodiments, the method 1300 can further comprise configuring the user equipment to receive, simultaneously, on the single mmWave antenna array module of the user equipment, the two or more different downlink signals from the two or more different transmission points, at 1303. In some embodiments, the method 1300 can further comprise steering a receiver spatial filter in order to increase a Signal to Inter-Layer-Group-Interference (SILGI) ratio, the SILGI ratio being a ratio of a desired unique beamforming array (UBA) signal to inter-layer-group-interference, at 1304.

Figure 28:
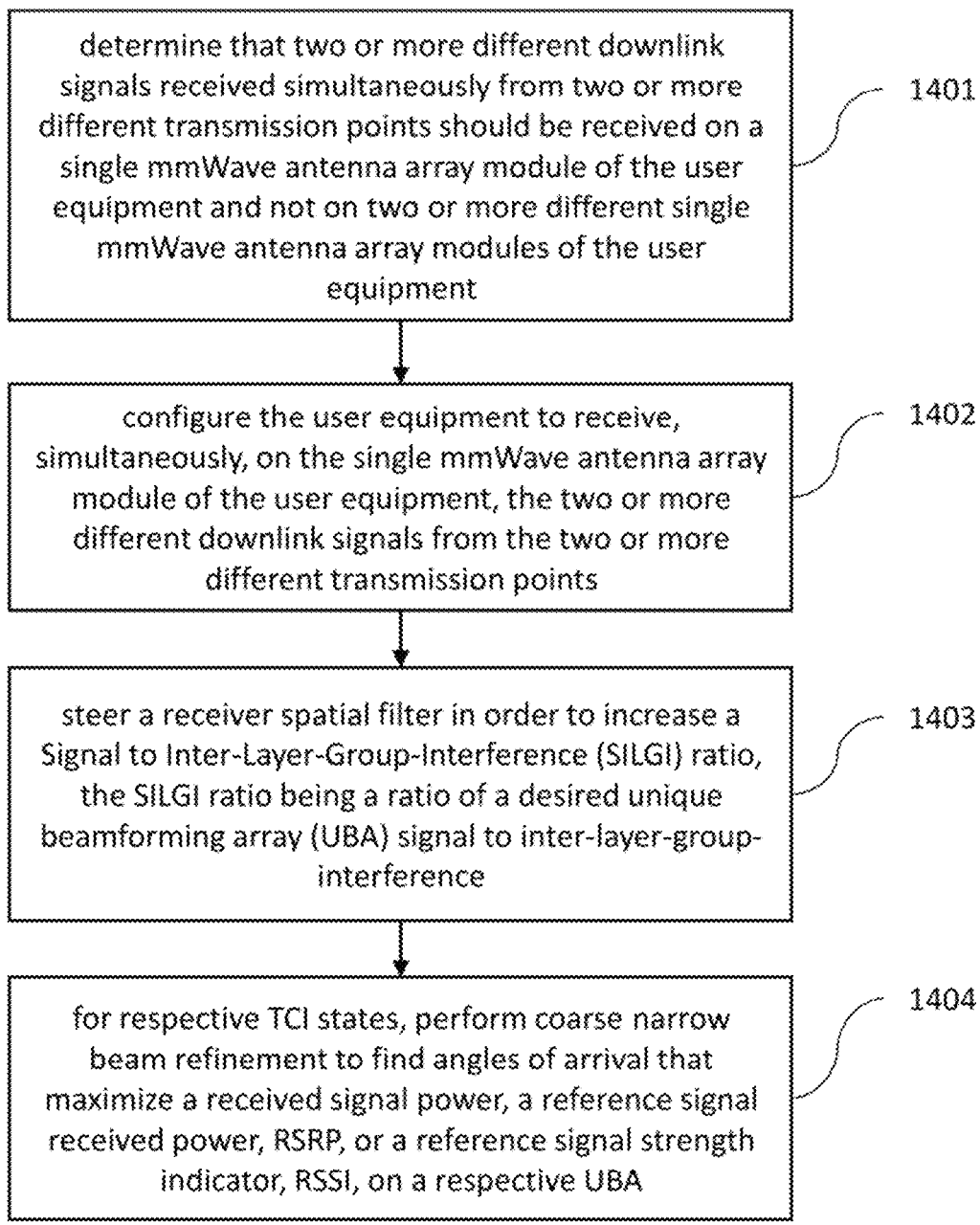
FIG. 28 is a process flow diagram of an example method described herein.

Referring now to FIG. 28, a method 1400 is illustrated that can be carried out by means, such as an apparatus comprising a processor and a memory storing computer program codes/instructions. The method 1400 can alternatively or additionally be carried out by means such as the apparatus 100 or the UE 203 described above. In some embodiments, the method 1400 can comprise determining that two or more different downlink signals received simultaneously from two or more different transmission points should be received on a single mmWave antenna array module of the user equipment and not on two or more different single mmWave antenna array modules of the user equipment, at 1401. In some embodiments, the method 1400 can comprise configuring the user equipment to receive, simultaneously, on the single mmWave antenna array module of the user equipment, the two or more different downlink signals from the two or more different transmission points, at 1402. In some embodiments, the method 1400 can further comprise steering a receiver spatial filter in order to increase a Signal to Inter-Layer-Group-Interference (SILGI) ratio, the SILGI ratio being a ratio of a desired unique beamforming array (UBA) signal to inter-layer-group-interference, at 1403. In some embodiments, the method 1400 can further comprise for respective TCI states, performing coarse narrow beam refinement to find angles of arrival that maximize a received signal power, a reference signal received power, RSRP, or a reference signal strength indicator, RSSI, on a respective UBA, at 1404.

Figure 29:
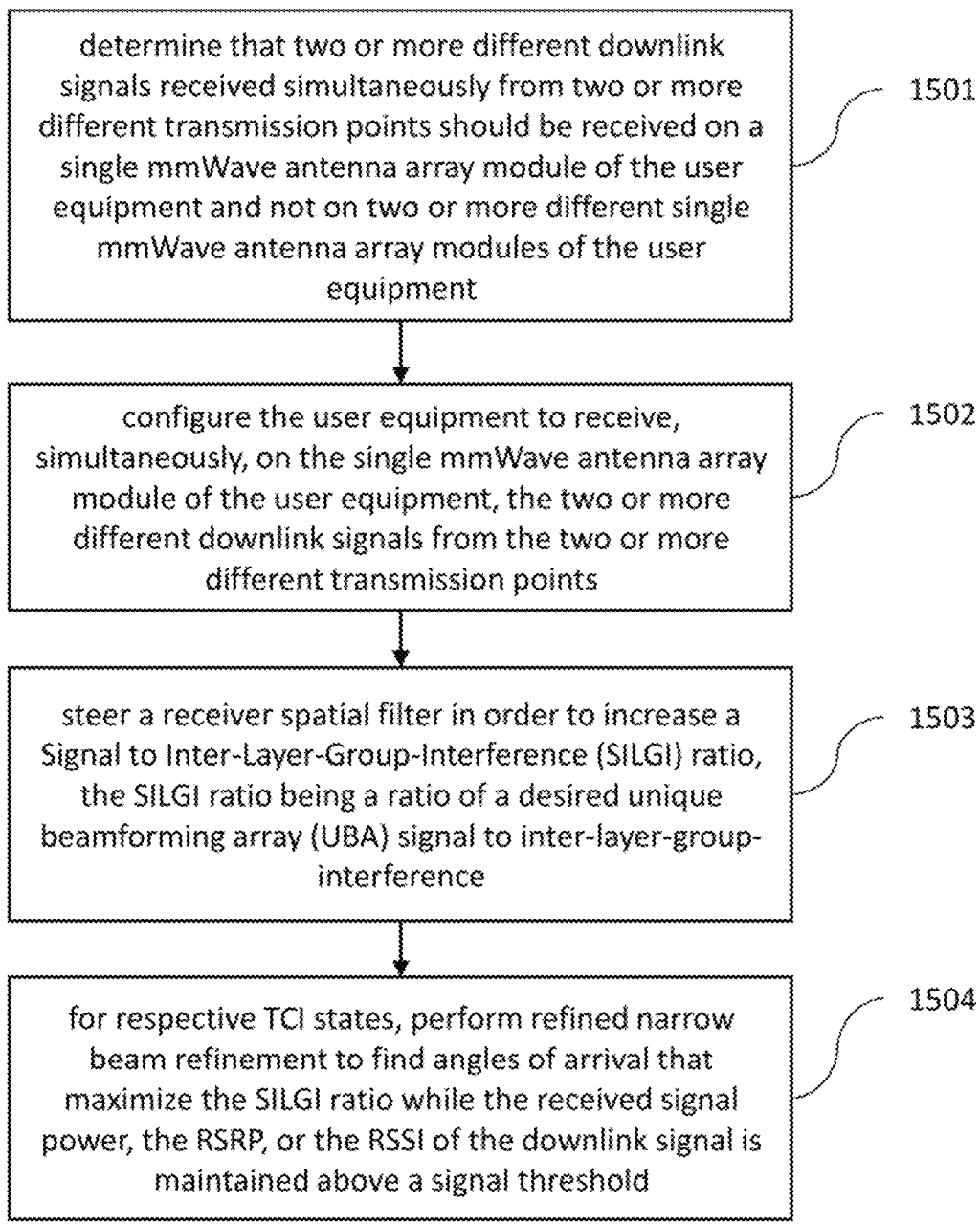
FIG. 29 is a process flow diagram of an example method described herein.

Referring now to FIG. 29, a method 1500 is illustrated that can be carried out by means, such as an apparatus comprising a processor and a memory storing computer program codes/instructions. The method 1500 can alternatively or additionally be carried out by means such as the apparatus 100 or the UE 203 described above. In some embodiments, the method 1500 can comprise determining that two or more different downlink signals received simultaneously from two or more different transmission points should be received on a single mmWave antenna array module of the user equipment and not on two or more different single mmWave antenna array modules of the user equipment, at 1501. In some embodiments, the method 1500 can comprise configuring the user equipment to receive, simultaneously, on the single mmWave antenna array module of the user equipment, the two or more different downlink signals from the two or more different transmission points, at 1502. In some embodiments, the method 1500 can further comprise steering a receiver spatial filter in order to increase a Signal to Inter-Layer-Group-Interference (SILGI) ratio, the SILGI ratio being a ratio of a desired unique beamforming array (UBA) signal to inter-layer-group-interference, at 1503. In some embodiments, the method 1500 can further comprise for respective TCI states, performing refined narrow beam refinement to find angles of arrival that maximize the SILGI ratio while the received signal power, the RSRP, or the RSSI of the downlink signal is maintained above a signal threshold, at 1504.

Where a structural feature has been described, it may be replaced by means for performing one or more of the functions of the structural feature whether that function or those functions are explicitly or implicitly described.

In some but not necessarily all examples, the disclosed apparatus (e.g., 100, 203) can be configured to communicate data from the disclosed apparatus (e.g., 100, 203) with or without local storage of the data in a memory and with or without local processing of the data by circuitry or processors at the apparatus. The data may, for example, be measurement data or data produced by the processing of measurement data. The data may be stored in processed or unprocessed format remotely at one or more devices. The data may be stored in the Cloud. The data may be processed remotely at one or more devices. The data may be partially processed locally and partially processed remotely at one or more devices. The data may be communicated to the remote devices wirelessly via short range radio communications such as Wi-Fi or Bluetooth, for example, or over long-range cellular radio links. The apparatus may comprise a communications interface such as, for example, a radio transceiver for communication of data.

The disclosed apparatus (e.g., 100, 203) may be part of the Internet of Things forming part of a larger, distributed network.

The processing of the data, whether local or remote, may, without limitation, be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the disclosed apparatus (e.g., 100, 203) where it may produce an output sensible to the subject such as an audio output, visual output or haptic output.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The disclosed apparatus (e.g., 100, 203) can be configured as at least one of: a base station, an access point, a relay station, an apparatus for Industrial Internet of Things (IIoT), a moving robot, an unmanned aerial vehicle (UAV), a data acquisition system, or a transmission/reception point. The apparatus 100 can be configured as a stationary electronic device, meaning that the device is disposed in a building or on a tower/mast or other stationary structure so that the device does not move during operation. The apparatus 100 can be configured as a stationary electronic device such as, and not limited to: a base station, an access point, a relay station, an IIoT apparatus, a data acquisition system or a transmission/reception point.

The disclosed apparatus (e.g., 100, 203) can be configured as a portable electronic device. Alternatively, the disclosed apparatus (e.g., 100, 203) can be configured as a movable electronic device. The disclosed apparatus (e.g., 100, 203) can be configured as a portable or movable electronic device, or disposed on or in a portable or movable electronic device such as, and not limited to: a moving robot, an unmanned aerial vehicle (UAV), a vehicle (car, aircraft, motorcycle, vessel, bicycle, as non-limiting examples), a smartphone or mobile phone, a portable computing device, and a tablet.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

While endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   at least one processor; and
   at least one memory storing instructions that, when executed by the at least one processor, cause the apparatus at least to:
   determine that two or more different downlink signals received simultaneously from two or more different transmission points should be received on a single mmWave antenna array module of the apparatus,
   wherein respective downlink signals of the two or more different downlink signals comprise one or two layers per signal carrying the transmission configuration indicator, TCI, at least one downlink control information, and one or more channel state information per transmission point, and
   wherein respective downlink signals of the two or more different downlink signals further comprise one or more TCIs, respective TCIs having a respective TCI state;
   receive, simultaneously, on the single mmWave antenna array module of the apparatus, the two or more different downlink signals from the two or more different transmission points; and
   steer one or more receiver spatial filters in order to maximize a signal to inter-layer-group-interference, SILGI, ratio, the SILGI ratio being a ratio of a unique beamforming array, UBA, desired signal to inter-layer-group-interference.

2. The apparatus of claim 1, wherein the apparatus is further configured to steer the receiver spatial filters by:
   for respective TCI states, performing coarse narrow beam refinement to find angles of arrival, AoAs, that maximize a received signal power, a reference signal received power, RSRP, or a reference signal strength indicator, RSSI, on a respective UBA.

3. The apparatus of claim 1, wherein the apparatus is further configured to steer the receiver spatial filter by:
   for respective TCI states, performing refined narrow beam refinement to find AoAs that maximize the SILGI ratio while the received signal power, the RSRP, or the RSSI of the downlink signal is maintained above a signal threshold.

4. The apparatus of claim 1, wherein the apparatus is further configured to:
   determine that the apparatus is configured for reception of simultaneous transmission from multiple transmission points with multiple active TCI states that are not sharing spatial receiver filters at the apparatus.

5. The apparatus of claim 4, wherein the apparatus is further configured to:
   determine, based on the determination that the apparatus is configured for reception of simultaneous transmission from multiple transmission points with multiple active TCI states that are not configured for sharing spatial receiver filters at the apparatus, multiple downlink control information, DCIs, with full overlapping time and frequency resource elements of a physical downlink shared channel, PDSCH.

6. The apparatus of claim 1, wherein the received signal power is equal to or greater than an RSRP threshold.

7. The apparatus of claim 2, wherein the apparatus is further configured to perform the coarse narrow beam refinement for each TCI state to find AoAs that maximize at least one of the received signal power, the RSRP, or the RSSI on each UBA, to find the two dual polarized beams with the strongest received signal power, RSRP, or RSSI, via a narrow beam sweep, during one or more of:
   aperiodic transmission of non-zero power channel state information reference symbols, NZP-CSI-RS, with repetition being implemented for respective active TCI states, synchronization symbol, SS, bursts, or
   cyclic prefix based on beam sweeping during/via a physical downlink shared channel, PDSCH.

8. The apparatus of claim 3, wherein the apparatus is further configured to perform the refined narrow beam refinement by:
   measuring a desired signal for a first UBA and a second UBA of a same mmWave antenna array module;
   measuring inter-layer-group interference, ILGI, for the first UBA and the second UBA of the same mmWave antenna array module; and
   calculating the SILGI ratio for the first UBA and the second UBA of the same mmWave antenna array module.

9. The apparatus of claim 3, wherein the apparatus is further configured to:
   after completing a measurement sequence of a full orthogonal frequency-division multiplexing, OFDM, symbol burst, discard the measurements from the beams that lead to a desired signal level below the signal threshold.

10. The apparatus of claim 1, wherein the apparatus is further configured to steer the receiver spatial filter in order to increase the SILGI ratio by:
    steering UBA beam 1 away from AoA2 from TCI2; and
    steering UBA beam 2 away from AoA1 from TCI1.

11. The apparatus of claim 1, wherein the apparatus is configured to:
    send, to the network node, an indication for at least each TCI of at least one or more of:
    a signal strength of the desired signal, the IGLI, or the SILGI, wherein said indication for each TCI is included in at least one of: uplink control information, an L1 reporting message, or a medium access control, MAC, message.

12. A method comprising:
    determining, at a user equipment, that two or more different downlink signals received simultaneously from two or more different transmission points should be received on a single mmWave antenna array module of the user equipment, wherein respective downlink signals of the two or more different downlink signals comprise one or two layers per signal carrying the transmission configuration indicator, TCI, at least one downlink control information, and one or more channel state information per transmission point, and wherein respective downlink signals of the two or more different downlink signals further comprise one or more TCIs, respective TCIs having a respective TCI state;

receiving, simultaneously, on the single mmWave antenna array module of the user equipment, the two or more different downlink signals from the two or more different transmission points; and steering one or more receiver spatial filters in order to maximize a signal to inter-layer-group-interference, SILGI, ratio, the SILGI ratio being a ratio of a unique beamforming array, UBA, desired signal to inter-layer-group-interference.

13. The method of claim 12, wherein the steering the receiver spatial filter comprises:

for respective TCI states, performing coarse narrow beam refinement to find angles of arrival, AoAs, that maximize a received signal power, a reference signal received power, RSRP, or a reference signal strength indicator, RSSI, on a respective UBA.

14. The method of claim 12, wherein the steering the receiver spatial filter comprises:

for respective TCI states, performing refined narrow beam refinement to find AoAs that maximize the SILGI ratio while the received signal power, the RSRP, or the RSSI of the downlink signal is maintained above a signal threshold.

15. The method of claim 12, further comprising:

determining that the user equipment is configured for reception of simultaneous transmission from multiple transmission points with multiple active TCI states that are not sharing spatial receiver filters at the user equipment.

16. The method of claim 12, further comprising:

sending, to the network node, an indication for at least each TCI of at least one or more of: a signal strength of the desired signal, the IGLI, or the SILGI.

17. The method of claim 16, wherein at least the indication of one of more of: the strength of the desired signal, the ILGI, or the SILGI for each TCI is included in at least one of: uplink control information, an L1 reporting message, or a medium access control, MAC, message.

18. A non-transitory storage medium storing program instructions that, when executed by a processor, cause a user equipment at least to:

determine that two or more different downlink signals received simultaneously from two or more different transmission points should be received on a single mmWave antenna array module of the user equipment, wherein respective downlink signals of the two or more different downlink signals comprise one or two layers per signal carrying the transmission configuration indicator, TCI, at least one downlink control information, and one or more channel state information per transmission point, and wherein respective downlink signals of the two or more different downlink signals further comprise one or more TCIs, respective TCIs having a respective TCI state;

receive, simultaneously, on the single mmWave antenna array module of the user equipment, the two or more different downlink signals from the two or more different transmission points; and steer one or more receiver spatial filters in order to maximize a signal to inter-layer-group-interference, SILGI, ratio, the SILGI ratio being a ratio of a unique beamforming array, UBA, desired signal to inter-layer-group-interference.

19. The non-transitory storage medium of claim 18, wherein the signal received power is equal to or greater than an RSRP threshold.

20. The non-transitory storage medium of claim 18, wherein the program instructions, when executed by the processor, cause the user equipment to perform:

sending, to the network node, an indication for at least each TCI of at least one or more of: a signal strength of the desired signal, the IGLI, or the SILGI.

21. The non-transitory storage medium of claim 20, wherein at least the indication of one of more of: the strength of the desired signal, the ILGI, or the SILGI for each TCI is included in at least one of: uplink control information, an L1 reporting message, or a medium access control, MAC, message.

* * * * *